(12) United States Patent
Mizutani et al.

(10) Patent No.: US 11,760,109 B2
(45) Date of Patent: Sep. 19, 2023

(54) TAPE CASSETTE INCLUDING RFID TAG POSITIONED TO OVERLAP WITH TAPE ROLL ACCOMMODATED IN CASSETTE CASE

(71) Applicant: BROTHER KOGYO KABUSHIKI KAISHA, Nagoya (JP)

(72) Inventors: Hiromitsu Mizutani, Ichinomiya (JP); Shota Iijima, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/950,607

(22) Filed: Sep. 22, 2022

(65) Prior Publication Data

US 2023/0017162 A1    Jan. 19, 2023

Related U.S. Application Data

(62) Division of application No. 16/796,571, filed on Feb. 20, 2020, now Pat. No. 11,479,052.

(30) Foreign Application Priority Data

Mar. 15, 2019  (JP) .................................. 2019-048035

(51) Int. Cl.
*B41J 32/00* (2006.01)
*B41J 3/407* (2006.01)
(Continued)

(52) U.S. Cl.
CPC ........... *B41J 3/4075* (2013.01); *B41J 15/044* (2013.01); *B41J 32/00* (2013.01); *B41J 35/28* (2013.01); *G06K 19/07749* (2013.01)

(58) Field of Classification Search
CPC ........ B41J 3/4075; B41J 15/044; B41J 35/28; B41J 32/00
See application file for complete search history.

(56) References Cited

U.S. PATENT DOCUMENTS

2001/0040855 A1   11/2001   Hiraguchi et al.
2001/0043436 A1   11/2001   Onmori et al.
(Continued)

FOREIGN PATENT DOCUMENTS

| CN | 101100142 A | 1/2008 |
|---|---|---|
| CN | 203472298 U | 3/2014 |

(Continued)

OTHER PUBLICATIONS

Chinese Office Action for the related Chinese Patent Application No. 202010170374.3 dated Nov. 11, 2022.
(Continued)

*Primary Examiner* — Leslie J Evanisko
(74) *Attorney, Agent, or Firm* — Kenealy Vaidya LLP

(57) ABSTRACT

A cassette tape includes: a cassette case; a first tape roll and a second tape roll accommodated in the cassette case and rotatably supported thereby; and an RFID tag disposed at one of an upper wall and a lower wall of the cassette case. The first tape roll includes a first tape wound about a first winding axis extending in an axial direction. The second tape roll includes a second tape wound about an axis different from the first winding axis and extending in the axial direction. The second tape roll has a smaller diameter than the first tape roll. The RFID tag includes an antenna and a storage element for radiocommunication to read and write data. A part of the RFID tag is positioned to overlap with a part of the first tape roll in a predetermined direction parallel to the axial direction.

11 Claims, 14 Drawing Sheets

(51) Int. Cl.
  *B41J 15/04* (2006.01)
  *B41J 35/28* (2006.01)
  *G06K 19/077* (2006.01)

(56) References Cited

U.S. PATENT DOCUMENTS

| | | |
|---|---|---|
| 2008/0231423 A1 | 9/2008 | Maeda et al. |
| 2010/0188693 A1 | 7/2010 | Dan |
| 2012/0039651 A1 | 2/2012 | Yamaguchi et al. |
| 2012/0080550 A1 | 4/2012 | Yamaguchi et al. |
| 2018/0222233 A1 | 8/2018 | Bond et al. |

FOREIGN PATENT DOCUMENTS

| | | | |
|---|---|---|---|
| CN | 104691118 A | | 6/2015 |
| CN | 107175934 A | | 9/2017 |
| CN | 108394189 A | | 8/2018 |
| JP | H10-208436 A | | 8/1998 |
| JP | 2000-090637 A | | 3/2000 |
| JP | 2002-008342 A | | 1/2002 |
| JP | 2002-083482 A | | 3/2002 |
| JP | 2006-512224 A | | 4/2006 |
| JP | 2008-234485 A | | 10/2008 |
| JP | 2018-051774 A | | 4/2018 |
| KR | 20150011088 A | * | 1/2015 |
| WO | 2004/058509 A1 | | 7/2004 |
| WO | 2006/033393 A1 | | 3/2006 |

OTHER PUBLICATIONS

Japanese Office Action for the related Japanese Patent Application No. 2019-048035 dated Feb. 14, 2023.

* cited by examiner

TAPE CASSETTE INCLUDING RFID TAG POSITIONED TO OVERLAP WITH TAPE ROLL ACCOMMODATED IN CASSETTE CASE

CROSS REFERENCE TO RELATED APPLICATION

This application is a Divisional of and claims priority benefit under 35 U.S.C. § 120 to U.S. patent application Ser. No. 16/796,571 filed on Feb. 20, 2020 and claims priority benefit under 35 U.S.C. § 119 of Japanese Patent Application No. 2019-048035 filed Mar. 15, 2019, respectively, all of which are hereby incorporated in their entireties by reference.

TECHNICAL FIELD

The present disclosure relates to a tape cassette.

BACKGROUND

A tape cassette provided with a memory cell capable of storing data therein is known in the art. For example, International Publication No. WO2006/033393 discloses a tape cassette including a case and a radio circuit memory cell positioned on an outer peripheral wall surface of the case (see FIGS. 4 through 6 of the WO publication) or on a bottom wall of the case (see FIGS. 80 through 82 of the WO publication). A tape printer for this tape cassette is provided with an antenna to perform data reading and data writing relative to the radio circuit memory cell through radiocommunication in a state where the tape cassette is attached to the tape printer.

SUMMARY

For example, in a laminated-type tape cassette, a roll of ink ribbon for use in printing, a roll of film tape on which characters are to be printed, and a roll of adhesive tape configured to be affixed to the printed film tape are accommodated in a case of the tape cassette. Here, in the laminated-type tape cassette, the adhesive tape roll is a heaviest member among the rolls. In other words, a position of center of gravity of the tape cassette is approximately the same as a position of the adhesive tape roll.

In a state where a tape cassette is attached to a tape printer, a posture of the tape cassette is likely to be unstable particularly at positions farther away from the center of gravity of the tape cassette. According to the tape cassette described in the above-identified WO publication, the radio circuit memory cell is arranged at a position relatively remote from the adhesive tape roll. Hence, the position of the radio circuit memory cell tends to be unstable in the state where the tape cassette is attached to the tape printer.

Due to lack of stability as to the position of the radio circuit memory cell, the radio circuit memory cell may not be able to maintain a proper positional relationship with the antenna of the tape printer. Hence, communication failure may occur between the radio circuit memory cell and the antenna.

In order to restrain occurrence of the communication failure, an opening/closing cover may be provided for pressing the tape cassette attached to the tape printer by the cover to stabilize the posture of the tape cassette. However, conceivably, a radiocommunication between the radio circuit memory cell and the antenna may also be required even in a state where the cover is opened. Further, if the tape cassette is attached to the tape printer with an inclined posture of the tape cassette, the tape cassette may be kept with its improper posture although the cover is pressing the attached tape cassette.

In view of the foregoing, it is an object of the disclosure to provide a tape cassette capable of stabilizing a position of RFID tag provided in a tape cassette while the tape cassette is attached to the tape printer.

In order to attain the above and other objects, according to one aspect, the disclosure provides a tape cassette including a cassette case, a first tape roll, a second tape roll, and an RFID tag. The cassette case includes an upper wall and a lower wall. The first tape roll is accommodated in the cassette case and is rotatably supported between the upper wall and the lower wall. The first tape roll includes a first tape wound about a first winding axis extending in an axial direction. The second tape roll is accommodated in the cassette case and is rotatably supported between the upper wall and the lower wall. The second tape roll includes a second tape axis different from the first winding axis extending in the axial direction. The second tape roll defines a diameter smaller than a diameter of the first tape roll. Printing is configured to be performed on one of the first tape and the second tape. The first tape and the second tape are affixed to each other after the printing. The RFID tag is disposed at one of the upper wall and the lower wall. The RFID tag includes: an antenna; and a storage element for radiocommunication to read and write data. A part of the RFID tag is positioned to overlap with a part of the first tape roll in a predetermined direction parallel to the axial direction.

According to another aspect, the disclosure provides a tape cassette including a cassette case, a first tape roll, and an RFID tag. The cassette case includes an upper wall and a lower wall. The first tape roll is accommodated in the cassette case and is rotatably supported between the upper wall and the lower wall. The first tape roll includes a first tape wound about a first winding axis extending in an axial direction. Printing is configured to be performed on the first tape. The RFID tag is disposed at one of the upper wall and the lower wall. The RFID tag includes an antenna, and a storage element for radiocommunication to read and write data. The first tape paid out from the first tape roll is configured to be discharged out of the cassette case independently without being affixed to any other tape. A part of the RFID tag is positioned to overlap with a part of the first tape roll in a predetermined direction parallel to the axial direction.

According to still another aspect, the disclosure provides a tape cassette including a cassette case, a first tape roll, and an RFID tag. The cassette case includes an upper wall and a lower wall. The first tape roll is accommodated in the cassette case and is rotatably supported between the upper wall and the lower wall. The first tape roll includes a first tape wound about a first winding axis extending in an axial direction. Printing is configured to be performed on the first tape. The RFID tag is disposed at one of the upper wall and the lower wall. The RFID tag includes an antenna, and a storage element for radiocommunication to read and write data. The RFID tag also includes a base on which the antenna and the storage element are provided. The base is formed with a through-hole extending therethrough in the axial direction. A part of the through-hole is positioned to overlap with a part of the first tape roll in a predetermined direction parallel to the axial direction.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Figure 1:
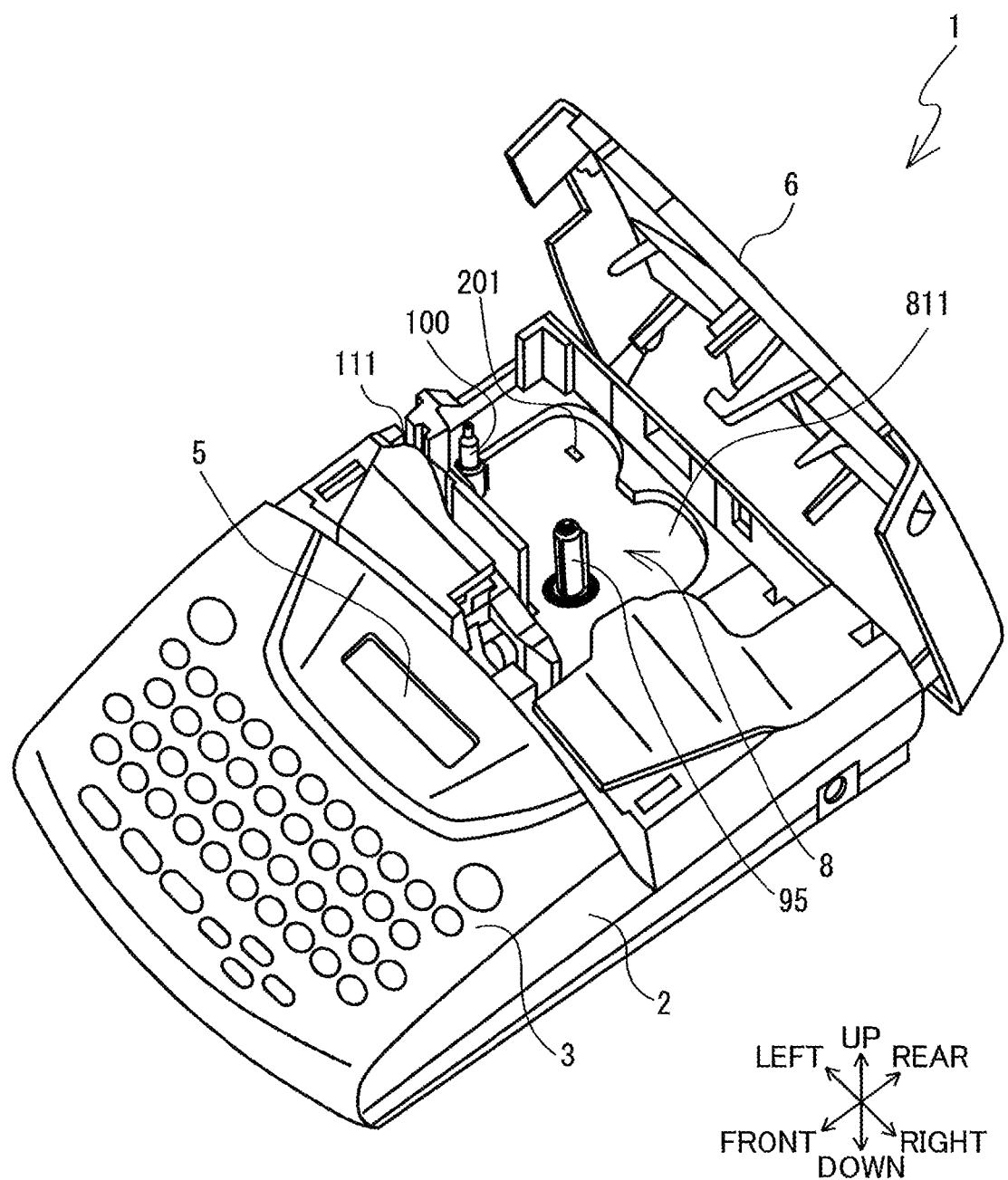
FIG. 1 is a perspective view of a tape printer for a tape cassette according to an embodiment in a state where a cassette cover is open.

A tape printer 1 and a tape cassette 30 according to an embodiment of the disclosure will be described with reference to FIGS. 1 through 6.

The attached drawings are merely exemplary to facilitate understanding of the disclosure, and configurations of devices, parts and components according to various embodiments of the disclosure should not be considered to be limited to those illustrated in the drawings. Further, in the following description, directions with respect to the tape printer 1 will be referred to based on those shown in FIG. 1. More specifically, a diagonally lower-left side, a diagonally upper-right side, a diagonally lower-right side, a diagonally upper-left side, an upper side, and a lower side in FIG. 1 will be respectively defined as a front side, a rear side, a right side, a left side, an upper side and a lower side of the tape printer 1. Further, directions with respect to the tape cassette 30 will be referred to based on those shown in FIG. 2. More specifically, a diagonally lower-right side, a diagonally upper-left side, a diagonally upper-right side, a diagonally lower-left side, an upper side, and a lower side in FIG. 2 will be respectively defined as a front side, a rear side, a right side, a left side, an upper side, and a lower side of the tape cassette 30.

Further, in the following description, a frontward direction and a rearward direction will be correctively referred to as a frontward/rearward direction; a leftward direction and a rightward direction will be correctively referred to as a leftward/rightward direction; and an upward direction and a downward direction will be correctively referred to as an upward/downward direction.

First, the tape printer 1 for use with the tape cassette 30 of the embodiment will be described with reference to FIGS. 1 through 3.

The tape printer 1 is a general-purpose printer capable of accepting various types of tape cassettes for use, such as a thermal-type tape cassette, a receptor-type tape cassette, and a laminated-type tape cassette. The thermal-type tape cassette includes a heat-sensitive tape. The receptor-type tape cassette includes a print tape and an ink ribbon. The laminated-type tape cassette includes a double-sided adhesive tape, a film tape, and an ink ribbon.

As illustrated in FIG. 1, the tape printer 1 includes a main housing 2 of a generally rectangular parallelepiped shape. A keyboard 3 is provided on a frontward portion on an upper surface of the main housing 2. A liquid crystal display 5 is provided rearward of the keyboard 3. A cassette cover 6 is provided rearward of the liquid crystal display 5. The cassette cover 6 is supported by the main housing 2 and is configured to be opened and closed for replacement of the tape cassette 30 (FIG. 2) with a new cassette 30.

Inside the main housing 2, a cassette receiving portion 8 is provided for detachably receiving the tape cassette 30. An ejection slit 111 is formed in a left side wall of the main housing 2, more specifically, at a rearward portion of the left side wall near the cassette receiving portion 8. A printed tape is ejected out of the cassette receiving portion 8 through the ejection slit 111.

Figure 2:
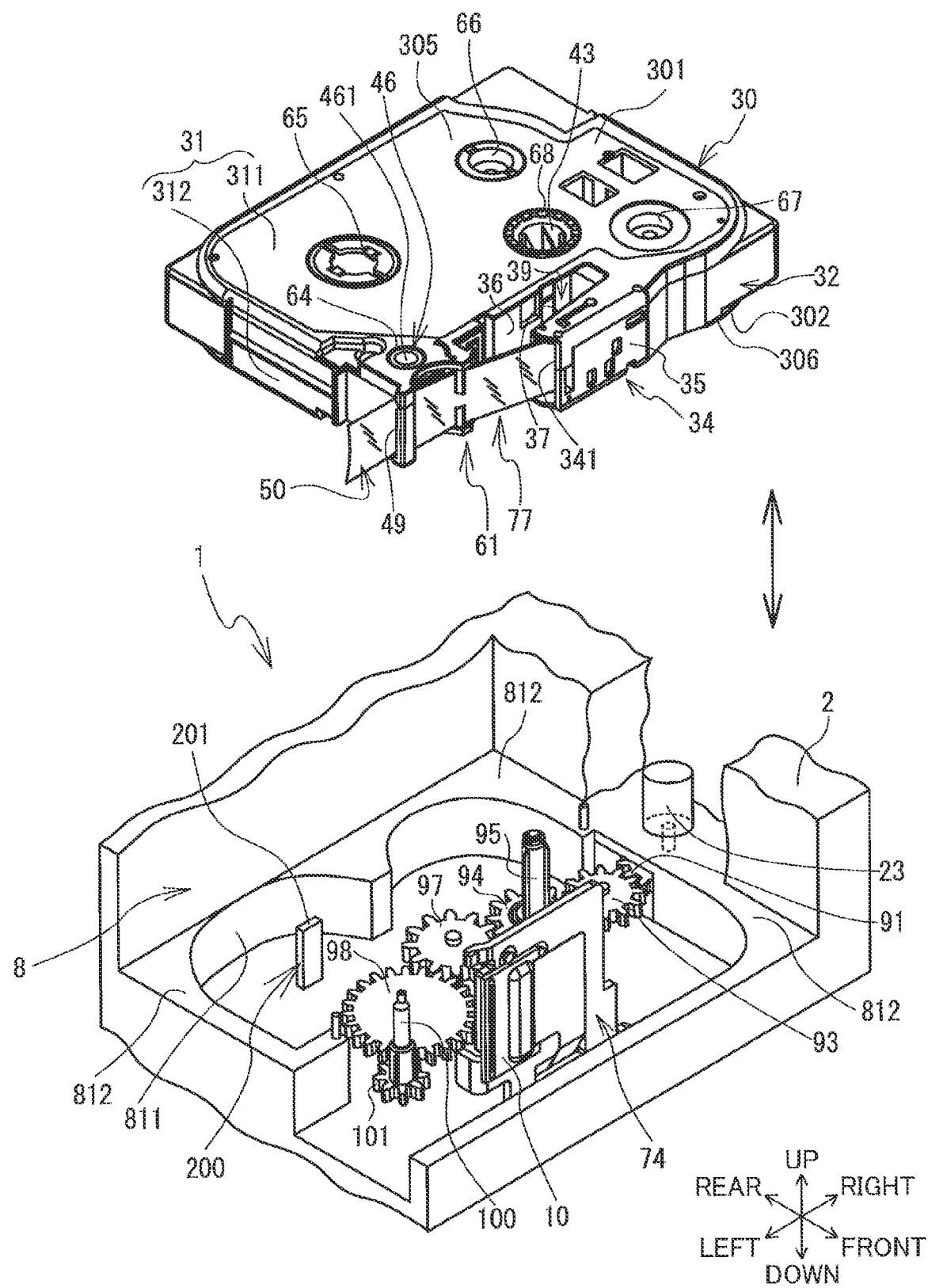
FIG. 2 is a perspective view for description of the tape cassette according to the embodiment and a cassette receiving portion of the tape printer.
Figure 3:
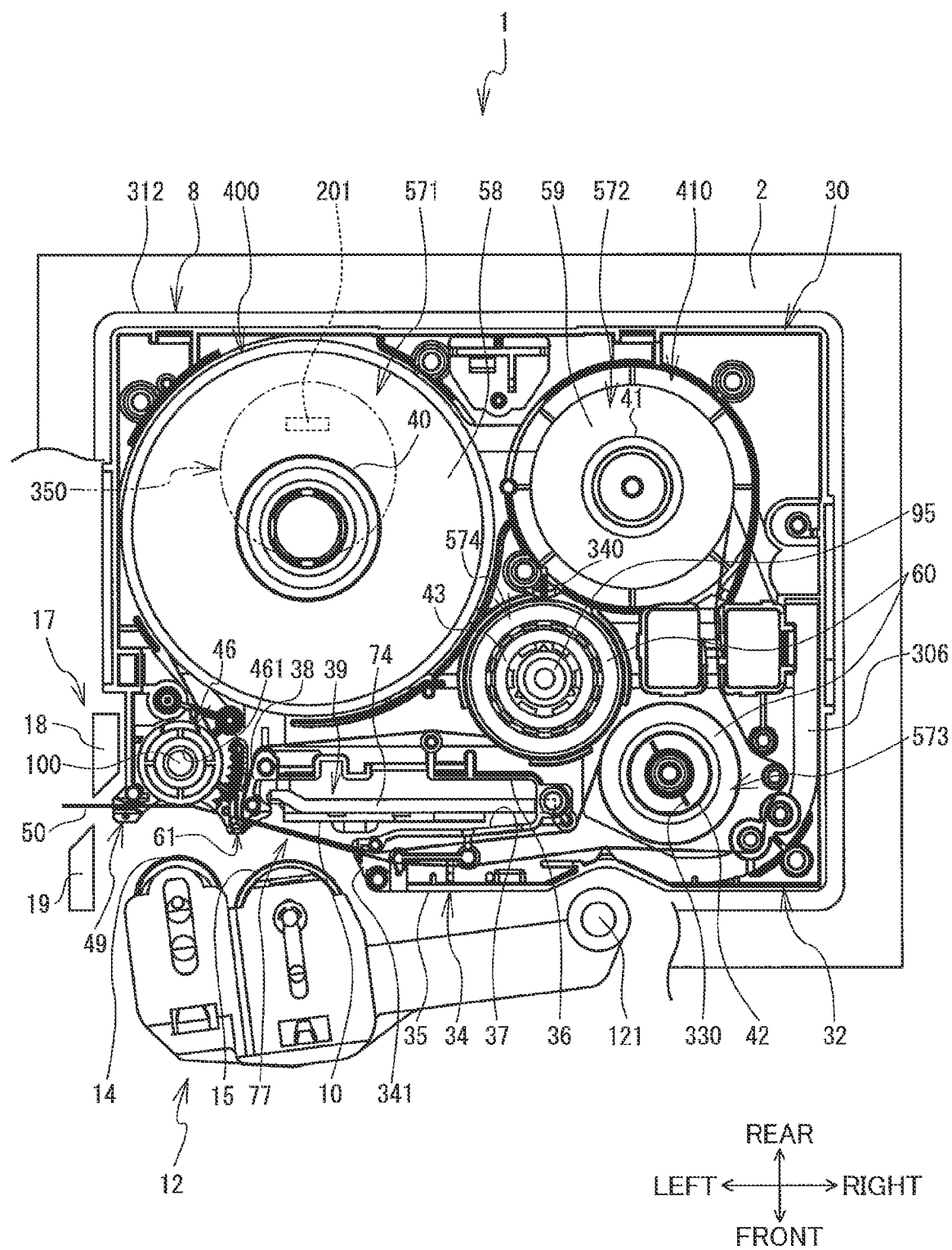
FIG. 3 is a plan view of the cassette receiving portion to which the tape cassette according to the embodiment is attached.

In FIGS. 2 and 3, a side wall defining a profile of the cassette receiving portion 8 is illustrated for an explanatory purpose. As illustrated in FIGS. 1 and 2, the cassette receiving portion 8 includes a cavity 811 and corner support portions 812. The cavity 811 has a recessed shape with a flat bottom surface so as to generally conform with a bottom surface of the tape cassette 30 (more specifically, a bottom surface 302 of a cassette case 31 of the tape cassette 30). The corner support portions 812 are flat surface portions horizontally extending from an outer edge of the cavity 811. The corner support portions 812 are configured to support lower surfaces of marginal portions of the tape cassette 30 attached to the cassette receiving portion 8.

A head holder 74 made from metal is provided at a front portion of the cassette receiving portion 8. A thermal head 10 including heat generating elements (not illustrated) is mounted on the head holder 74. The head holder 74 is inserted in a head opening 39 (described later) of the tape cassette 30 upon attachment of the tape cassette 30 to the cassette receiving portion 8.

Referring to FIG. 2, a tape drive motor 23 having a drive shaft is positioned outside of the cassette receiving portion 8. A gear train including gears 91, 93, 94, 97, 98 and 101 is provided below a bottom surface of the cavity 811. That is, the gear train is covered and hidden by the bottom surface of the cavity 811 (see FIG. 1). However, for simplifying description, the bottom surface of the cavity 811 is not illustrated in FIG. 2. The gear 91 is fixed to a lower end portion of the drive shaft of the tape drive motor 23. In the gear train, the gear 91 is in meshing engagement with the gear 93 which is in meshing engagement with the gear 94. The gear 94 is in meshing engagement with the gear 97 which is in meshing engagement with the gear 98, which is in meshing engagement with the gear 101.

A ribbon take-up shaft 95 is fixed the gear 94 and extends upward from an upper surface of the gear 94. A ribbon take-up spool 43 of the tape cassette 30 is attachable to and detachable from the ribbon take-up shaft 95. A tape drive shaft 100 is fixed to the gear 101 and extends upward from an upper surface of the gear 101. The tape drive shaft 100 is insertable into and removable from a hole 461 of a tape drive roller 46 of the tape cassette 30 in accordance with attachment/detachment of the tape cassette 30 relative to the cassette receiving portion 8.

In a state where the tape cassette 30 is attached to the cassette receiving portion 8, a counterclockwise rotation of the gear 91 driven by the tape drive motor 23 causes a counterclockwise rotation of the ribbon take-up spool 95 through the gears 93 and 94. Hence, the ribbon take-up spool 43 attached to the ribbon take-up shaft 95 rotates in a counterclockwise direction. Further, the rotation of the gear 94 is transmitted to the tape drive shaft 100 through the gears 97, 98 and 101, so that the tape drive shaft 100 rotates in a clockwise direction, thereby rotating the tape drive roller 46 attached to the tape drive shaft 100.

As illustrated in FIG. 3, an arm-shaped platen holder 12 is positioned frontward of the head holder 74. The platen holder 12 has a base end portion supported by a pivot shaft 121 and pivotable about an axis of the pivot shaft 121, and a free end portion rotatably supporting a platen roller 15 and a movable conveyor roller 14. The platen roller 15 is configured to oppose the thermal head 10 to make contact with and separate from the thermal head 10. The movable conveyor roller 14 is configured to oppose the tape drive roller 46 attached to the tape drive shaft 100 so that the movable conveyor roller 14 can contact and separate from the tape drive roller 46.

The platen holder 12 is connected to a release lever (not illustrated) that is movable leftward and rightward in interlocking relation to opening/closing motions of the cassette cover 6. The release lever is configured to move rightward to move the platen holder 12 toward a standby position as illustrated in FIG. 3 in accordance with the opening motion of the cassette cover 6. In the standby position, the platen holder 12 is positioned away from the cassette receiving portion 8. Hence, a user can perform attachment and detachment of the tape cassette 30 to and from the cassette receiving portion 8.

The release lever is configured to move leftward to move the platen holder 12 rearward toward a printing position (not illustrated) in accordance with the closing motion of the cassette cover 6. In the printing position, the platen holder 12 is positioned adjacent to the cassette receiving portion 8. In the attached state of the tape cassette 30 to the cassette receiving portion 8, the platen roller 15 presses against the thermal head 10 through the tape, and at the same time, the movable conveyor roller 14 presses against the tape drive roller 46 through the tape. In the printing position, the tape printer 1 can perform printing using the tape cassette 30 attached to the cassette receiving portion 8.

A cutting mechanism 17 is positioned rightward of the ejection slit 111 (FIG. 1). The cutting mechanism 17 is configured to cut the tape ejected from the tape cassette 30 at a predetermined position. The cutting mechanism 17 includes a fixed blade 18 and a movable blade 19 both of which are made of metal. The movable blade 19 is movable in the frontward/rearward direction (upward and downward in FIG. 3) relative to the fixed blade 18 so as to oppose the fixed blade 18.

The tape printer 1 also includes an RFID reader/writer 200 (see FIG. 2) configured to read and write data with respect to RFID (radio frequency identification) tag through short range wireless communication. The RFID reader/writer 200 has a well-known configuration in the art and includes an antenna 201 and a reader/writer IC (not illustrated). As illustrated in FIGS. 1 and 2, the antenna 201 is positioned at the bottom surface of the cavity 811. The antenna 201 is positioned to face, in the upward/downward direction, an RFID tag 350 (see FIGS. 3 through 6) of the tape cassette 30 attached to the cassette receiving portion 8.

Next, the tape cassette 30 will be described in detail with reference to FIGS. 2 and 3. The tape cassette 30 is a versatile cassette attachable to a thermal printer, a laminated-type printer, and a receptor-type printer by suitably changing the kind of the tape accommodated in the cassette case 31. In the depicted embodiment, the laminated-type tape cassette 30 is employed as an example.

As illustrated in FIGS. 2 and 3, the tape cassette 30 includes the cassette case 31 as a housing. The cassette case 31 has a generally box-like shape and has a generally rectangular shape with rounded corners in a plan view (a box shape). Specifically, the cassette case 31 includes an upper case 311 and a lower case 312. The lower case 312 includes a lower wall 306 having the bottom surface 302. The upper case 311 includes an upper wall 305 having an upper surface 301. The upper case 311 is fixed to an upper portion of the lower case 312.

The cassette case 31 includes five support portions for rotatably supporting a roller and spools accommodated in the cassette case 31. Specifically, the five support portions are: a roller support portion 64 positioned at a left-front corner portion of the cassette case 31; a first tape support portion 65 positioned at a left-rear portion of the cassette case 31; a second tape support portion 66 positioned at a right-rear portion of the cassette case 31; a ribbon support portion 67 positioned at a right-front portion of the cassette case 31; and a take-up spool support portion 68 positioned between the first tape support portion 65 and the ribbon support portion 67 in the frontward/rearward direction in a plan view.

The roller support portion 64 rotatably supports the tape drive roller 46 (see FIG. 3). The first tape support portion 65 rotatably supports a first tape spool 40 (see FIG. 3), and the second tape support portion 66 rotatably supports a second tape spool 41 (see FIG. 3). The ribbon support portion 67 rotatably supports a ribbon supply spool 42 (see FIG. 3). The take-up spool support portion 68 rotatably supports the ribbon take-up spool 43 (see FIG. 3).

The cassette case 31 includes a front wall 32. The front wall 32 includes an arm front wall 35. The arm front wall 35 extends in the leftward/rightward direction across a left-right center of a front end of the cassette case 31. An arm back wall 37 is positioned away from and rearward of the arm front wall 35 to extend in the upward/downward direction. Hence, the arm front wall 35 and the arm back wall 37 together provide an arm portion 34 at a front end portion of the tape cassette 30. That is, the arm portion 34 is a portion extending leftward from a right-front portion of the tape cassette 30. The arm portion 34 has a left end formed with a discharge opening 341. The discharge opening 341 is a gap defined between the arm front wall 35 and the arm back wall 37 and extending in the upward/downward direction.

A head peripheral wall 36 is positioned rearward of the arm portion 34. The head peripheral wall 36 extends rearward from a right end of the arm back wall 37, and then is bent leftward generally in parallel to the arm back wall 37. A ribbon guide wall 38 is connected to a left end of the head peripheral wall 36 to extend frontward. The arm back wall 37, the head peripheral wall 36, and the ribbon guide wall 38 together define the head opening 39. The head opening 39 has a generally rectangular shape in a plan view, and extends vertically throughout a thickness of the tape cassette 30. The head opening 39 is positioned rearward of the arm portion 34, and penetrates through the lower wall 306 and the upper wall 305 in the upward/downward direction. The head opening 39 extends in the leftward/rightward direction across a left-right center of the cassette case 31. The head opening 39 has a left end portion that is open frontward. This open end of the head opening 39 serves as an exposure region 77. The head holder 74 supporting the thermal head 10 is configured to be inserted in the head opening 39 upon attachment of the tape cassette 30 to the cassette receiving portion 8.

As illustrated in FIG. 3, a double-sided adhesive tape 58, a film tape 59, and an ink ribbon 60 are accommodated in the cassette case 31. The film tape 59 is a transparent tape on which characters are to be printed using the ink ribbon 60. The double-sided adhesive tape 58 has an adhesive layer on each surface, and a release paper is stuck on an entire region of one of the surfaces. The double-sided adhesive tape 58 is to be stuck on a printed surface of the film tape 59. The double-sided adhesive tape 58, the film tape 59 and the ink ribbon 60 are configured to be conveyed along respective conveying passages such that each widthwise direction of each tape extends in parallel to the upward/downward direction of the cassette case 31.

Within the cassette case 31, a first tape region 400 and a second tape region 410 are defined for accommodating the respective tapes. The first tape region 400 is generally circular in shape in a plan view and occupies a left-rear region of an interior of the cassette case 31. A first tape roll 571 is accommodated in the first tape region 400 in the present embodiment. More specifically, referring to FIG. 6, the first tape roll 571 is rotatably supported by the first tape support portion 65 provided at the lower case 312. The first tape roll 571 is a roll of the double-sided adhesive tape 58 wound around the first tape spool 40 supported by the first tape support portion 65. In the first tape roll 571, the double-sided adhesive tape 58 is wound such that the release paper faces radially outward.

The second tape region 410 is generally circular in shape in a plan view and occupies a right-rear region of the interior of the cassette case 31. A second tape roll 572 is accommodated in the second tape region 410. The second tape roll 572 is a roll of the film tape 59 wound around the second tape spool 41 supported by the second tape support portion 66.

A supply ribbon roll 573 is also accommodated in the cassette case 31. The supply ribbon roll 573 is located in a right-front region of the interior of the cassette case 31. The supply ribbon roll 573 is a roll of the ink ribbon 60 wound over the ribbon supply spool 42 supported by the ribbon support portion 67. A take-up ribbon roll 574 is also accommodated in the cassette case 31. The take-up ribbon roll 574 is located in an area surrounded by the first tape region 400, the second tape region 410, the ribbon supply spool 42, and the head opening 39. The take-up ribbon roll 574 is a roll of the ink ribbon 60 to be wound over the ribbon take-up spool 43 supported by the take-up spool support portion 68.

The above-described first tape roll 571, the second tape roll 572, the supply ribbon roll 573, and the take-up ribbon roll 574 are supported between the upper wall 305 and the lower wall 306 such that each rotation axis (winding center) extends in the upward/downward direction. The second tape roll 572 defines a center axis AX (FIG. 4) and has a diameter smaller than that of the first tape roll 571. Here, the diameter of each roll is defined as a radial length extending perpendicular to the upward/downward direction from the rotation axis (winding center).

The tape cassette 30 also includes clutches 330, 340 made from metal. The clutch 330 is configured to impart load on the supply ribbon roll 573 to prevent the supply ribbon roll 573 from rotating in a reversal direction which is opposite to a normal direction for supplying the ink ribbon 60 from the supply ribbon roll 573. The clutch 340 is configured to impart load on the take-up ribbon roll 574 to prevent the take-up ribbon roll 574 from rotating in a reversal direction which is opposite to a normal direction for taking up the ink ribbon 60 around the ribbon take-up spool 43. In the present embodiment, the clutch 330 is a coil spring positioned at a lower portion of the ribbon supply spool 42 for restricting reversal rotation of the ribbon supply spool 42. The clutch 340 is a coil spring positioned at a lower portion of the ribbon take-up spool 43 for restricting reversal rotation of the ribbon take-up spool 43.

A separator 61 is provided leftward of the head opening 39 and adjacent to the ribbon guide wall 38. The separator 61 is configured to separate the film tape 59 and the ink ribbon 60 from each other at a position leftward of the exposure region 77, i.e., downstream of the exposure region 77 in a tape conveying direction. The tape drive roller 46 supported by the roller support portion 64 is positioned leftward of the separator 61. A front surface of the tape drive roller 46, i.e., part of an outer peripheral surface of the tape drive roller 46 is exposed to an outside of the cassette case 31. A tape discharge portion 49 is provided leftward of the tape drive roller 46 for discharging a printed tape 50 (printed film tape 59 affixed with the double-sided adhesive tape 58) to the outside of the tape cassette 30. The tape discharge portion 49 is positioned adjacent to the cutting mechanism 17 upon attachment of the tape cassette 30 to the cassette receiving portion 8 of the tape printer 1.

The RFID tag 350 of the tape cassette 30 will be described next in detail with reference to FIGS. 4 through 6. The RFID tag 350 is provided at the lower wall 306 of the cassette case 31 such that data reading and writing through wireless communication can be performed with the RFID tag 350. At least a part of the RFID tag 350 is positioned to overlap with part of the first tape roll 571 in an axial direction of a winding axis AX1 (rotation axis) of the first tape roll 571 (i.e., in the upward/downward direction). Here, the winding axis AX1 is defined as an imaginary linear line passing through a center of the first tape roll 571 in a plan view and extending in the upward/downward direction.

Figure 5:
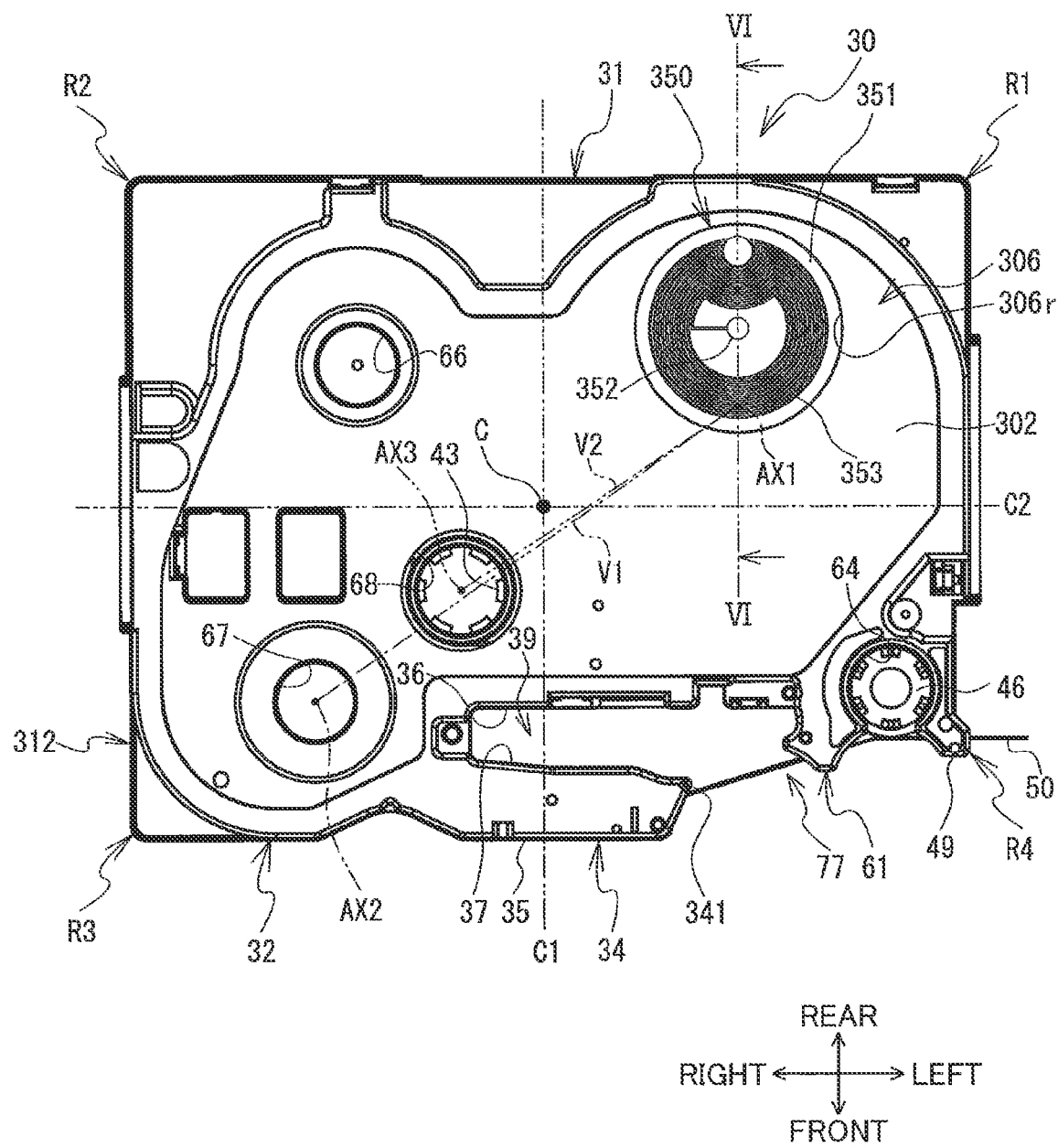
FIG. 5 is a bottom view of the tape cassette according to the embodiment.
Figure 6:
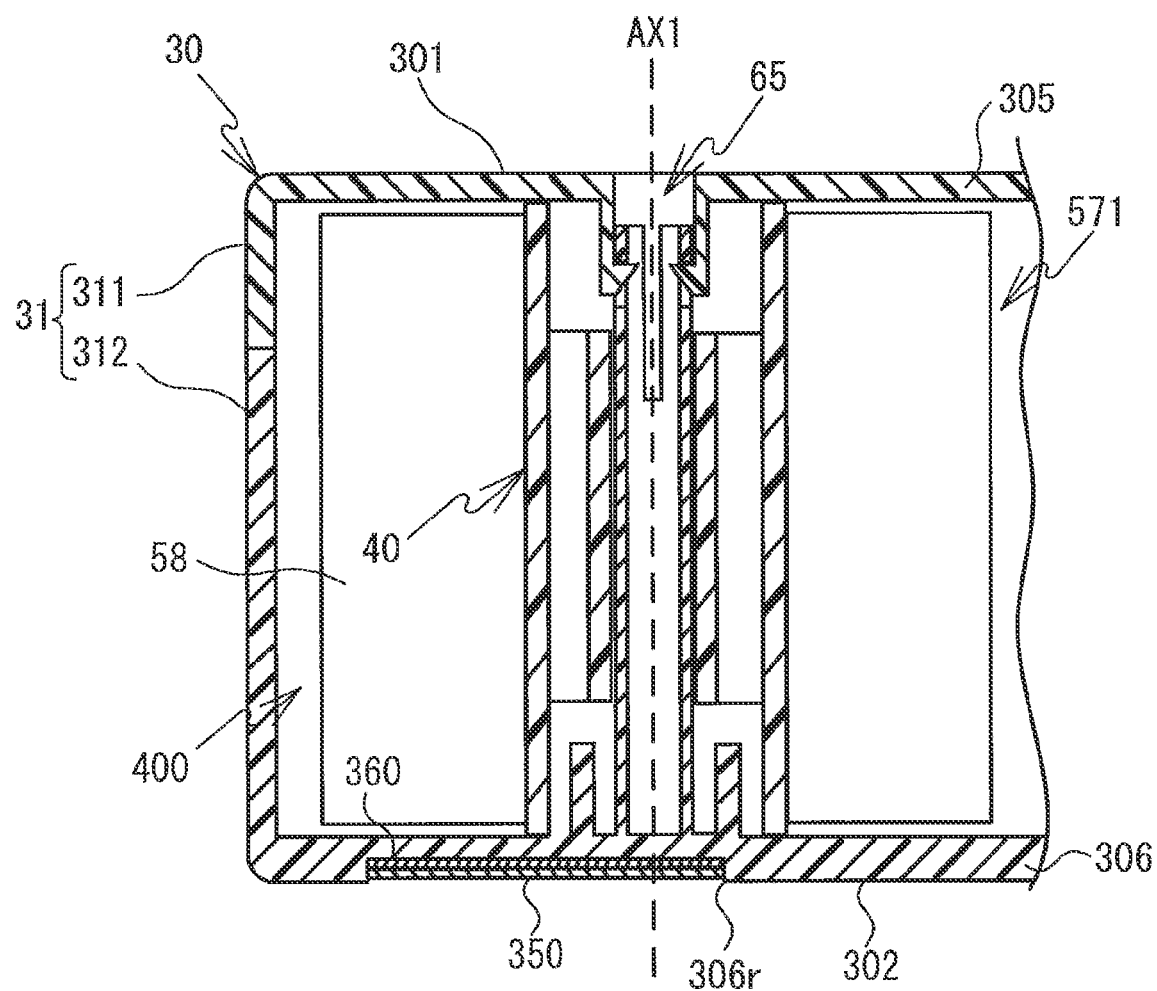
FIG. 6 is a cross-sectional view taken along a line VI-VI in FIG. 5.
Figure 6:
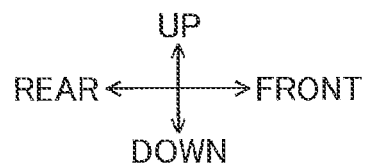

Specifically, referring to FIG. 5, the RFID tag 350 includes a seal base 351, a storage element 352, and an antenna 353. The seal base 351 is a circular film sheet having one surface on which the storage element 352 and the antenna 353 are positioned, and an opposite surface provided with an adhesive layer. The storage element 352 is an IC chip including a high frequency circuit, a memory, and a power supply circuit. The storage element 352 is positioned at a center of the seal base 351 in a plan view. The memory is configured to store therein data indicative of, for example, an identification number of the tape cassette 30, a kind of the tape, a width of the tape, and a printing color. The antenna 353 is a coil-shaped antenna wound to surround the storage element 352. In a plan view, the RFID tag 350 has an area smaller than that of the first tape region 400. The RFID tag 350 of the present embodiment is a passive type RFID tag, but the RFID tag 350 may be an active type RFID tag.

The lower wall 306 has a tag retaining portion 306r positioned below the first tape roll 571. The tag retaining portion 306r is a recessed portion that is recessed upward from the bottom surface 302. The tag retaining portion 306r is circular in shape and has a size in conformity with the size of the RFID tag 350. As illustrated in FIG. 6, the RFID tag 350 is positioned in the tag retaining portion 306r together with a shield member 360. The shield member 360 is a circular sheet made from well-known electromagnetic shielding material, and has a size in conformity with the size of the RFID tag 350. The shield member 360 is adhered to a circular top surface of the tag retaining portion 306r. The RFID tag 350 is adhered to a lower surface of the shield member 360. That is, the shield member 360 is a nonmagnetic member positioned between the first tape roll 571 and the RFID tag 350.

In this way, the RFID tag 350 is positioned at an outer surface of the cassette case 31 facing outward (i.e., at the bottom surface 302), and is positioned inside the tag retaining portion 306r that is recessed upward from the bottom surface 302. A total thickness of the shield member 360 and the RFID tag 350 is smaller than a depth of the tag retaining portion 306r. Hence, the RFID tag 350 does not protrude outward of the tag retaining portion 306r, but is retained inside the tag retaining portion 306r. A diametrical center portion of the RFID tag 350 (i.e., the storage element 352) is positioned rearward of the winding axis AX1 of the first tape roll 571 in a plan view, as is apparent from FIGS. 4 and 5.

Figure 4:
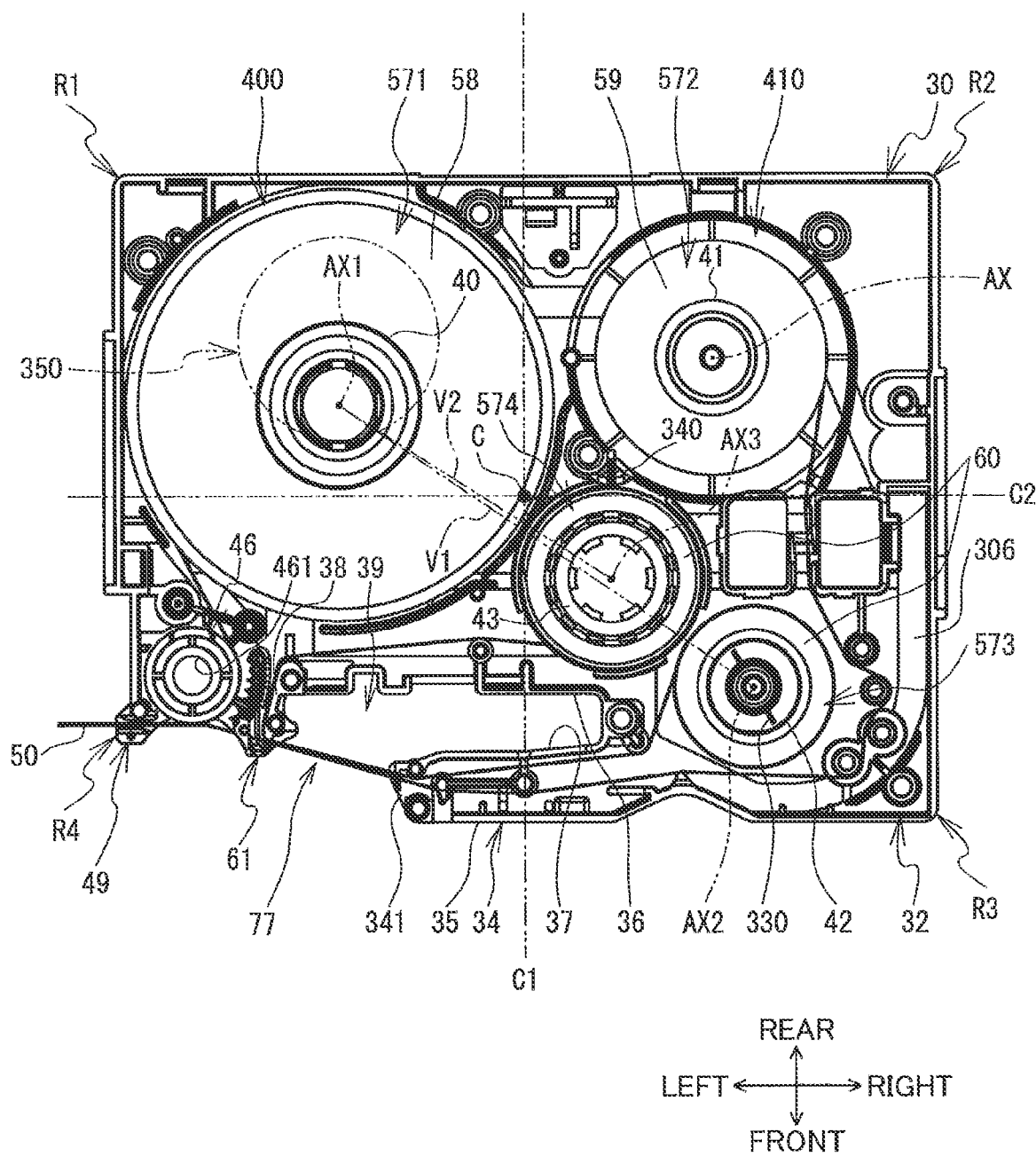
FIG. 4 is a plan view of the tape cassette according to the embodiment in which an upper case is removed.

Here, assume that the cassette case 31 is divided into four regions R1 through R4 by a first imaginary plane C1 and a second imaginary plane C2 as illustrated in FIGS. 4 and 5. The first imaginary plane C1 extends in the upward/downward direction and the frontward/rearward direction, and passes through the center of the cassette case 31 in the leftward/rightward direction. The second imaginary plane C2 extends in the upward/downward direction and the leftward/rightward direction, and passes through the center of the cassette case 31 in the frontward/rearward direction. The first imaginary plane C1 and the second imaginary plane C2 provide an intersection line (imaginary center line C) passing through the center of the tape cassette 30 in a plan view and extending in the upward/downward direction.

The divided region R1 is a left-rear region of the cassette case 31 with respect to the center line C. The divided region R2 is a right-rear region of the cassette case 31 with respect to the center line C. The divided region R3 is a right-front region of the cassette case 31 with respect to the center line C. The divided region R4 is a left-front region of the cassette case 31 with respect to the center line C. The clutches 330 and 340 are positioned in the divided regions R3 and R2, respectively, whereas the RFID tag 350 in its entirety is positioned in the divided region R1. Specifically, the divided region R1 is positioned diagonally opposite the divided region R3.

Also assume here that the cassette case 31 is divided by the second imaginary plane C2 into a front region which is a combination of the divided regions R3 and R4 and a rear region which is a combination of the divided regions R1 and R2. Based on this assumption, the head opening 39 is positioned in one of the two divided regions (that is, in the front region), whereas the RFID tag 350 is positioned in remaining one of the two divided regions (that is, in the rear region). Incidentally, the tape discharge portion 49 is positioned in the front region.

Further, referring to FIGS. 4 and 5, assume two imaginary planes V1 and V2. The imaginary plane V1 extends in the upward/downward direction to connect the winding axis AX1 of the first tape roll 571 and a winding axis AX2 of the supply ribbon roll 573. The imaginary plane V2 extends in the upward/downward direction to connect the winding axis AX1 of the first tape roll 571 and a winding axis AX3 of the take-up ribbon roll 574. The winding axis AX2 is an imaginary linear line passing through a center of the supply ribbon roll 573 in a plan view and extending in the upward/downward direction. The winding axis AX3 is an imaginary linear line passing through a center of the take-up ribbon roll 574 in a plan view and extending in the upward/downward direction. In the present embodiment, at least a part of the RFID tag 350 is positioned to cross both of the imaginary planes V1 and V2. Alternatively, a least a part of the RFID tag 350 may be positioned to cross at least one of the imaginary planes V1 and V2, rather than both of the imaginary planes V1 and V2.

Next, a printing operation performed in the tape printer 1 will be described with reference to FIG. 3.

In accordance with user's attachment of the laminated-type tape cassette 30 to the cassette receiving portion 8, the RFID tag 350 is positioned close to the antenna 201 from above. The tape printer 1 reads data from the RFID tag 350 through the RFID reader/writer 200. The tape printer 1 is capable of controlling the following printing operations according to the data (indicative of, for example, the kind and/or width of the tape) retrieved from the RFID tag 350. Further, the tape printer 1 can write data input through the keyboard 3 into the RFID tag 350 through the RFID reader/writer 200.

As the printing operation is initiated, the tape drive roller 46 and the ribbon take-up spool 43 are rotationally driven. The film tape 59 is paid out from the second tape roll 572, and the double-sided adhesive tape 58 is paid out from the first tape roll 571 by the cooperation of the tape drive roller 46 and the movable conveyor roller 14. The film tape 59 paid out from the second tape roll 572 is to be conveyed toward a right-front corner portion of the cassette case 31, passes through a region outside of the supply ribbon roll 573, and is then to be conveyed toward an inside of the arm portion 34. The double-sided adhesive tape 58 paid out from the supply ribbon roll 573 is to be conveyed toward a front side of the tape drive roller 46. In accordance with the rotation of the ribbon take-up spool 43, the ink ribbon 60 is paid out from the supply ribbon roll 573 and is to be conveyed toward the inside of the arm portion 34.

The film tape 59 and the ink ribbon 60 conveyed inside the arm portion 34 is configured to be overlapped with each other at the discharge opening 341, and then to be discharged toward the exposure region 77. In the exposure region 77, characters are printed on the film tape 59 by the thermal head 10 using the ink ribbon 60 overlapped with the film tape 59. The ink ribbon 60 used for printing is separated from the film tape 59 by the separator 61, moved along the ribbon guide wall 38, and finally wound over the take-up ribbon roll 574. The film tape 59 separated from the ink ribbon 60 is conveyed toward the front side of the tape drive roller 46.

The film tape 59 and the double-sided adhesive tape 58 moving through a position between the tape drive roller 46 and the movable conveyor roller 14 are conveyed toward the tape discharge portion 49. At this time, the double-sided adhesive tape 58 is adhered onto a printed surface of the film tape 59 to provide the printed tape 50. The printed tape 50 is then discharged outside of the cassette case 31 through the tape discharge portion 49, and is cut by the cutting mechanism 17.

As described above, the tape cassette 30 according to the present embodiment includes the cassette case 31, the first tape roll 571, the second tape roll 572 having the diameter smaller than the diameter of the first tape roll 571, and the RFID tag 350. Characters are configured to be printed on one surface of the film tape 59, and the double-sided adhesive tape 58 is then stuck on the printed surface of the film tape 59. At least a part of the RFID tag 350 is arranged to overlap with the first tape roll 571 in a prescribed direction, i.e., in the axial direction of the winding axis AX1 of the first tape roll 571 (the upward/downward direction).

With this structure, at least the part of the RFID tag 350 is overlapped with, in the predetermined direction, the first tape roll 571 that is the heaviest components in the tape cassette 30. Hence, the RFID tag 350 is at the position close to the center of gravity of the tape cassette 30. The closer the RFID tag 350 is positioned to the center of gravity, the more stable the posture of the tape cassette 30 tends to be in the attached state of the tape cassette 30 to the tape printer 1. Hence, arranging the RFID tag 350 closer to the center of gravity of the tape cassette 30 can contribute to stabilization in position of the RFID tag 350 in the attached state of the tape cassette 30 to the tape printer 1. As a result, improved wireless communication between the RFID reader/writer 200 and the RFID tag 350 can be realized.

Note that, in the tape cassette 30 of the embodiment, the double-sided adhesive tape 58 is an example of a first tape, and the film tape 59 is an example of a second tape. However, the tape cassette 30 may include a print tape as the first tape, and the film tape 59 as a second tape, in a case where the tape cassette 30 is a receptor-laminated type tape cassette. In this case, a roll of the print tape (first tape roll) has a diameter greater than a diameter of a roll of the film tape 59 (second tape roll). Printing is configured to be performed on one surface of the print tape (first tape), and the film tape 59 (second tape) is then affixed to the printed surface of the print tape. In this variation, the first tape roll (the roll of the print tape) is accommodated at a position corresponding to the second tape roll 572 of the embodiment (in the divided region R2 in FIG. 4), whereas the second tape roll (the roll of the film tape 59) is accommodated at a position corresponding to the first tape roll 571 of the embodiment (in the divided region R1 in FIG. 4). At least, a center of the first tape roll (the roll of the print tape) is positioned in the divided region R2 in FIG. 4. In this variation as well, the RFID tag 350 is positioned to overlap with the first tape roll (the roll of the print tape) in an axial direction thereof (i.e., in the upward/downward direction), since the first tape roll is heavier than the second tape roll.

In other words, according to the embodiment and its variation, printing may be performed on one of the first tape and the second tape; the first tape and the second tape may be affixed to each other after the printing; and at least part of the RFID tag 350 may be arranged to overlap with a part of the first tape roll (whose diameter is greater than that of the second tape roll) in the predetermined direction parallel to the axial direction of the axis of the first tape roll.

Further, the clutches 330 and 340 are positioned in the divided regions R3 and R2, whereas the RFID tag 350 is positioned at the divided region R1 different from the divided regions R2 and R3. With this structure, the RFID tag 350 is positioned far away from the clutches 330, 340 made from metal. Hence, the clutches 330 and 340 do not impede wireless communication between the RFID reader/writer 200 and the RFID tag 350. Further, the divided region R1 is positioned diagonally opposite the divided region R3 where the clutch 330 is disposed. Hence, the RFID tag 350 can be arranged far away from the clutch 330, and therefore, radiocommunication failure due to the clutches 330, 340 can be restrained securely.

Further, at least the part of the RFID tag 350 is positioned to cross at least one of the imaginary planes V1 and V2 (in the embodiment, the RFID tag 350 has a portion crossing both of the imaginary planes V1 and V2), as illustrated in FIGS. 4 and 5. Since the ribbon rolls (the supply ribbon roll 573 and the take-up ribbon roll 574) are relatively heavy in weight, the center of gravity of the tape cassette 30 is likely to be located at a position between the first tape roll 571 and the ribbon rolls. Hence, by arranging the part of the RFID tag 350 to cross at least one of the imaginary planes V1 and V2, the RFID tag 350 can be positioned as close to the center of gravity of the tape cassette 30 as possible.

Further, the shield member 360, which is a nonmagnetic member, is positioned between the first tape roll 571 and the RFID tag 350 in the tape cassette 30 of the embodiment. With this structure, the shield member 360 can prevent metallic components of the tape cassette 30 from adversely affecting wireless communication between the RFID reader/writer 200 and the RFID tag 350.

Further, the RFID tag 350 is provided at the lower wall 306 of the cassette case 31, more specifically, at the bottom surface 302 facing outward. The RFID tag 350 is also positioned inside the tag retaining portion 306r recessed upward from the bottom surface 302 of the lower wall 306. With this structure, since the RFID tag 350 does not protrude out of the tag retaining portion 306r, distortion of the RFID tag 350 due to accidental dropping of the tape cassette 30 is less likely to occur.

Further, the head opening 39 is positioned in the front region (the divided regions R3 and R4) of the cassette case 31, whereas the RFID tag 350 is positioned in the rear region (divided region R1) of the cassette case 31. With this structure, the RFID tag 350 can be positioned remote from the head holder 74 made from metal and inserted in the head opening 39. Hence, radiocommunication failure due to the head holder 74 can be reliably restrained.

Various modifications are conceivable to the depicted embodiment. Hereinafter, tape cassettes according to various modifications will be described with reference to FIGS. 7 through 14, wherein like parts and components are designated by the same reference numerals as those shown in FIGS. 1 through 6 to avoid duplicating description.

<First Modification>

Figure 7:
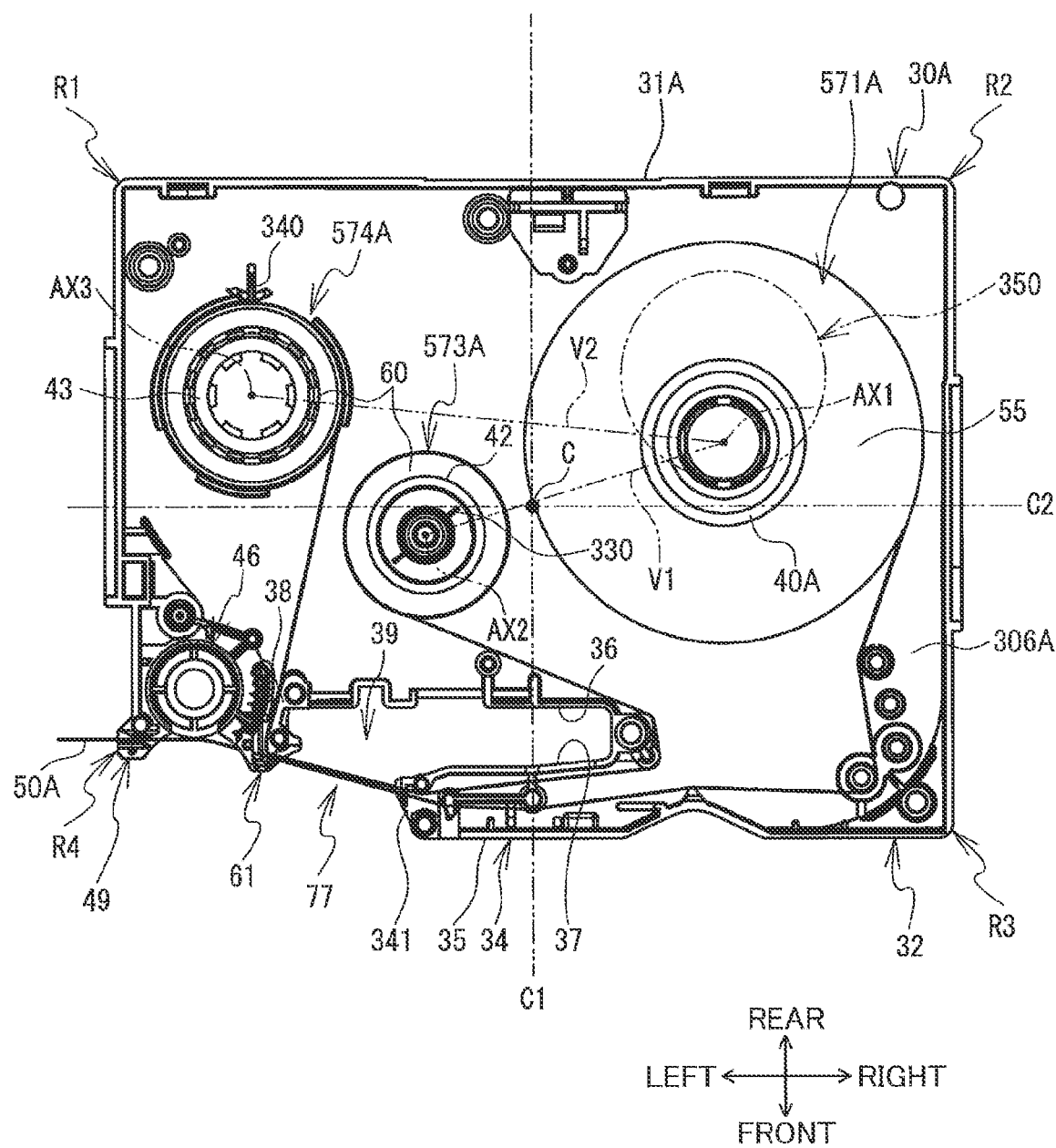
FIG. 7 is a plan view of a tape cassette according to a first modification in which an upper case is removed.
Figure 8:
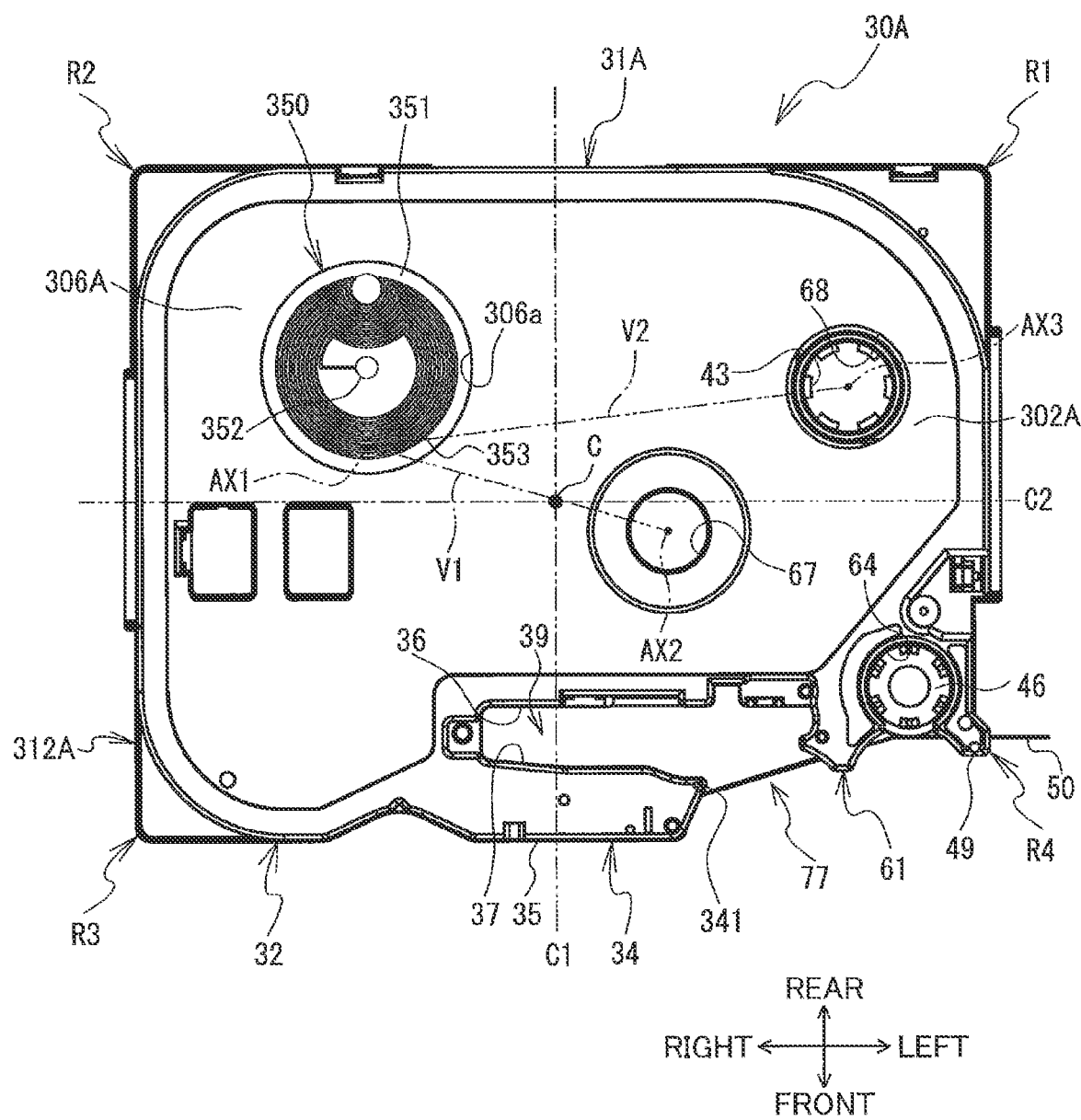
FIG. 8 is a bottom view of the tape cassette according to the first modification.

A tape cassette 30A according to a first modification will be described with reference to FIGS. 7 and 8.

The tape cassette 30A is different from the tape cassette 30 in terms of kinds of the tapes. The tape cassette 30A is a receptor-type tape cassette where a print tape 55 and the ink ribbon 60 are accommodated in a cassette case 31A. Specifically, in the tape cassette 30A, a first tape roll 571A is accommodated in a right region of the cassette case 31A. The first tape roll 571A is a roll of the print tape 55 wound around a first tape spool 40A. The print tape 55 is constituted by a plurality of layers including a printing sheet, an adhesive layer formed on one surface of the printing sheet, and a release sheet adhered to the adhesive layer. A take-up ribbon roll 574A is accommodated in a left-rear region of the cassette case 31A. That is, the take-up ribbon roll 574A is arranged at a different position from the take-up ribbon roll 574 of the embodiment. Further, a supply ribbon roll 573A is accommodated in the cassette case 31A at a region surrounded by the first tape roll 571A, the take-up ribbon roll 574A, and the head opening 39. That is, the supply ribbon roll 573A is arranged at a different position from the supply ribbon roll 573 of the embodiment.

Similar to the above-described embodiment, the RFID tag 350 is provided at a lower wall 306A of a lower case 312A of the cassette case 31A. At least a part of the RFID tag 350 is overlapped with at least a part of the first tape roll 571A in an axial direction of a winding axis AX1 of the first tape roll 571A (i.e., in the upward/downward direction). Specifically, a tag retaining portion 306a is formed in a bottom surface 302A of the lower wall 306A at a position below the first tape roll 571A. The RFID tag 350 and the shield member 360 are positioned inside of the tag retaining portion 306a (refer to FIG. 6). At least a part of the RFID tag 350 is positioned to cross the imaginary planes V1 and V2.

Here, assume that the cassette case 31A is divided into four regions R1 through R4, as in the cassette case 31 of the embodiment. Contrary to the tape cassette 30 of the embodiment, the clutches 330 and 340 in the tape cassette 30A are positioned in the divided regions R4 and R1, respectively. Further, the RFID tag 350 in its entirety is located in the divided region R2 which is positioned diagonally opposite the divided region R4.

Also assume that the cassette case 31A is divided by the first imaginary plane C1 into a left region (a combination of the divided regions R1 and R4) and a right region (a combination of the divided regions R2 and R3). The tape discharge portion 49 is positioned in one of the two divided regions (that is, the left region), whereas the RFID tag 350 is positioned in remaining one of the two divided regions (that is, the right region).

Although not illustrated, in a cassette receiving portion of a tape printer for receiving the tape cassette 30A, a ribbon take-up shaft and an antenna (corresponding to the ribbon take-up shaft 95 and antenna 201 of the embodiment) are provided at positions corresponding to the ribbon take-up spool 43 and the RFID tag 350 of the tape cassette 30A, respectively. Similar to the above-described embodiment, in a state where the receptor-type tape cassette 30A is attached to the cassette receiving portion, the RFID tag 350 is positioned close to the antenna from above to allow data reading and writing with respect to the RFID tag 350. Upon start of a printing operation, a character is printed on the print tape 55 paid out from the first tape roll 571A by a thermal head (corresponding to the thermal head 10) using the ink ribbon 60 paid out from the supply ribbon roll 573A. The print tape 55 (a printed tape 50A) is then discharged out of the cassette case 31A through the tape discharge portion 49.

Incidentally, the tape cassette 30A can be a thermal-type tape cassette which accommodates a heat sensitive tape therein as the print tape 55, without the ink ribbon 60. In a state where the thermal-type tape cassette 30A is attached to the cassette receiving portion, data reading and writing can be performed with respect to the RFID tag 350, similar to the first modification. As a printing operation is started, heat sensitive printing is performed, without using the ink ribbon 60, on the print tape 55 paid out from the first tape roll 571A by the thermal head. The print tape 55 (printed tape 50A) is discharged out of the cassette case 31A through the tape discharge portion 49.

As described above, the tape cassette 30A according to the first modification includes the cassette case 31A, the first tape roll 571A, and the RFID tag 350. The print tape 55 paid out from the first tape roll 571A is discharged out of the cassette case 31A without being affixed to any other tape. At least the part of the RFID tag 350 is overlapped with at least the part of the first tape roll 571A in the predetermined axial direction of the winding axis AX1 of the first tape roll 571A (i.e., in the upward/downward direction). With this structure, similar to the above-described embodiment, the position of the RFID tag 350 can be stabilized, thereby realizing enhanced radiocommunication between the RFID reader/writer and the RFID tag 350.

Further, the tape discharge portion 49 is positioned in one of the two divided regions (in the left region), while the RFID tag 350 is positioned in remaining one of the two divided regions (in the right region). With this structure, the RFID tag 350 can be at a position far away from a cutter mechanism (corresponding to the cutting mechanism 17) made from metal and positioned adjacent to the tape discharge portion 49. Hence, radiocommunication failure due to the cutter mechanism can further be restrained.

<Second Through Fourth Modifications>

Tape cassettes 30B, 30C and 30D according to second through fourth modifications will be described next with reference to FIGS. 9 through 11. These tape cassettes 30B, 30C and 30D are different from the tape cassette 30 according to the above-described embodiment in terms of the position of the RFID tag 350.

Figure 9:
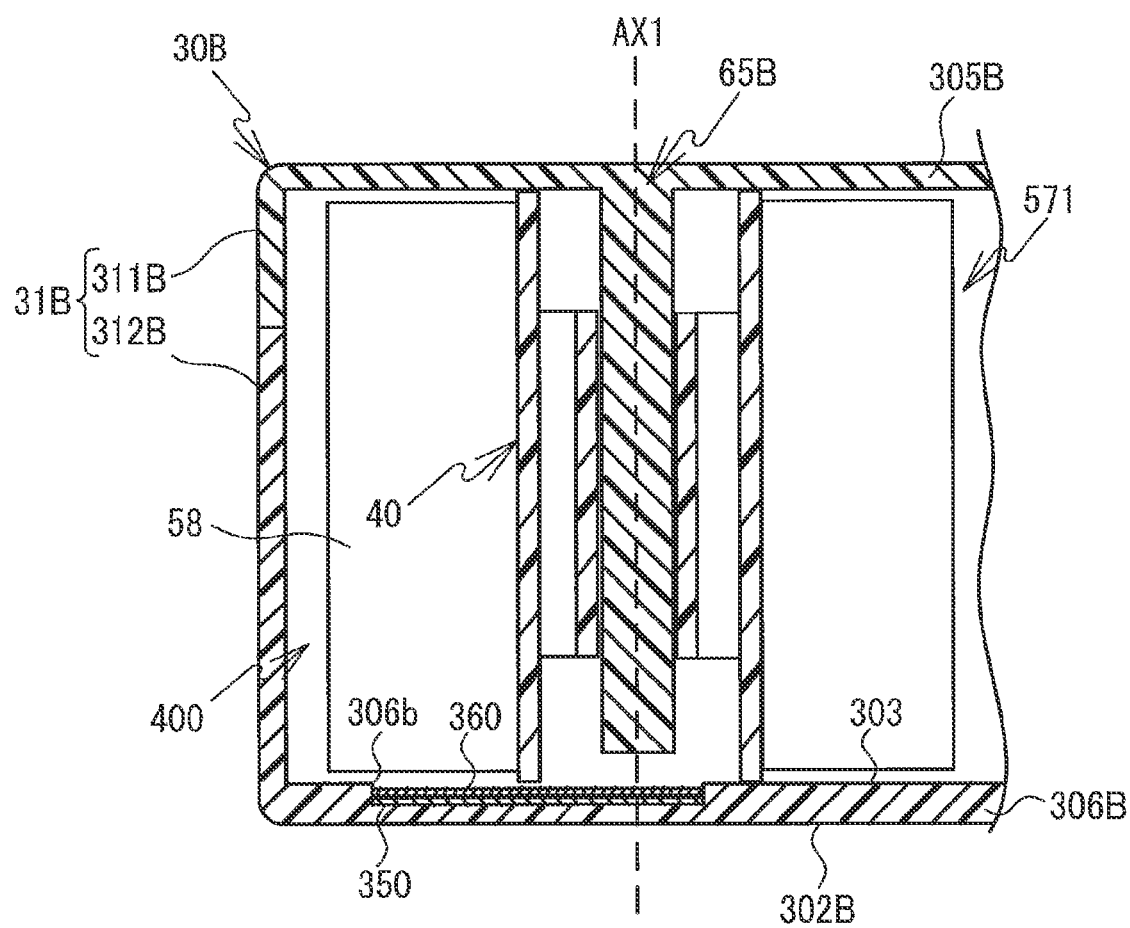
FIG. 9 is a cross-sectional view of a tape cassette according to a second modification taken along a line corresponding to the line VI-VI in FIG. 5.

FIG. 9 illustrates the tape cassette 30B according to the second modification. The tape cassette 30B includes a cassette case 31B configured of an upper case 311B and a lower case 312B. The first tape roll 571 is rotatably supported by a first tape support portion 65B provided at an upper wall 305B of the upper case 311B. The RFID tag 350 is provided at a lower wall 306B of the lower case 312B. Specifically, in a plan view, the RFID tag 350 of the tape cassette 30B is arranged at a position the same as the position of the RFID tag 350 of the tape cassette 30 (see FIGS. 4 through 6). However, the RFID tag 350 of the tape cassette 30B is not positioned on an outer surface (bottom surface 302B) of the lower wall 306B, but is positioned at an inner surface (inner surface 303) of the lower wall 306B. Specifically, the RFID tag 350 is positioned at the inner surface 303 of the lower wall 306B so as to face the first tape roll 571.

More specifically, in the lower wall 306B, a tag retaining portion 306b is formed in the inner surface 303 at a position directly below the first tape roll 571. The tag retaining portion 306b is a recessed portion that is recessed downward from the inner surface 303. The tag retaining portion 306b has a circular shape and is sized to conform with the size of the RFID tag 350. The RFID tag 350 and the shield member 360 are positioned inside the tag retaining portion 306b. The RFID tag 350 is adhered to a bottom surface of the tag retaining portion 306b. The shield member 360 is adhered to an upper surface of the RFID tag 350. That is, the shield member 360 is positioned between the first tape roll 571 and the RFID tag 350. The RFID tag 350 does not protrude out of the tag retaining portion 306b, but is retained inside the tag retaining portion 306b.

As described above, the RFID tag 350 of the tape cassette 30B is positioned at the inner surface 303 of the lower wall 306B so as to face the first tape roll 571. With this structure, the RFID tag 350 is retained within the tag retaining portion 306b, i.e., inside the cassette case 31B. Hence, distortion of the RFID tag 350 due to accidental dropping of the tape cassette 30B is unlikely to occur.

Figure 10:
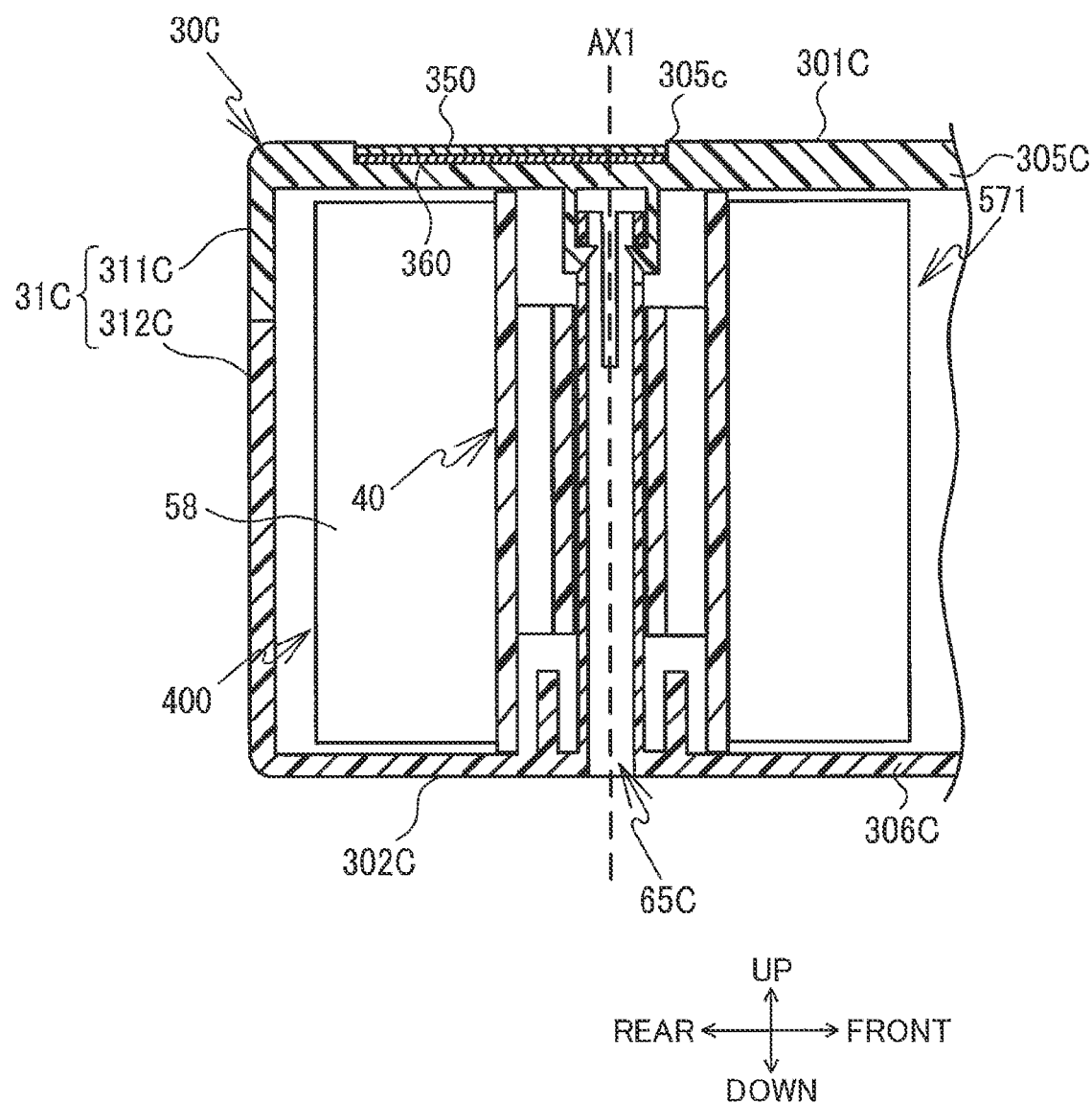
FIG. 10 is a cross-sectional view of a tape cassette according to a third modification taken along a line corresponding to the line VI-VI in FIG. 5.

FIG. 10 illustrates the tape cassette 30C according to the third modification. The tape cassette 30C includes a cassette case 31C configured of an upper case 311C and a lower case 312C. The first tape roll 571 is rotatably supported by a first tape support portion 65C provided at a lower wall 306C of the lower case 312C. In the third modification, the RFID tag 350 is provided at an upper wall 305C of the upper case 311C, rather than at the lower wall 306C. Specifically, in a plan view, the RFID tag 350 of the tape cassette 30C is at a position the same as the position of the RFID tag 350 of the tape cassette 30 (see FIGS. 4 through 6). However, the RFID tag 350 is positioned at an outer surface (upper surface 301C) of the upper wall 305C, not at an outer surface (bottom surface 302C) of the lower wall 306C.

More specifically, a tag retaining portion 305c is formed in the upper wall 305C at a position directly above the first tape roll 571. The tag retaining portion 305c is a recessed portion that is recessed downward from the upper surface 301C. The tag retaining portion 305c has a circular shape and is sized to conform with the size of the RFID tag 350.

The RFID tag 350 and the shield member 360 are disposed within the tag retaining portion 305c. The shield member 360 is adhered to a bottom surface of the tag retaining portion 305c. The RFID tag 350 is adhered to an upper surface of the shield member 360. That is, the shield member 360 is positioned between the first tape roll 571 and the RFID tag 350. The RFID tag 350 does not protrude out of the tag retaining portion 305c, but is retained inside the tag retaining portion 305c.

Figure 11:
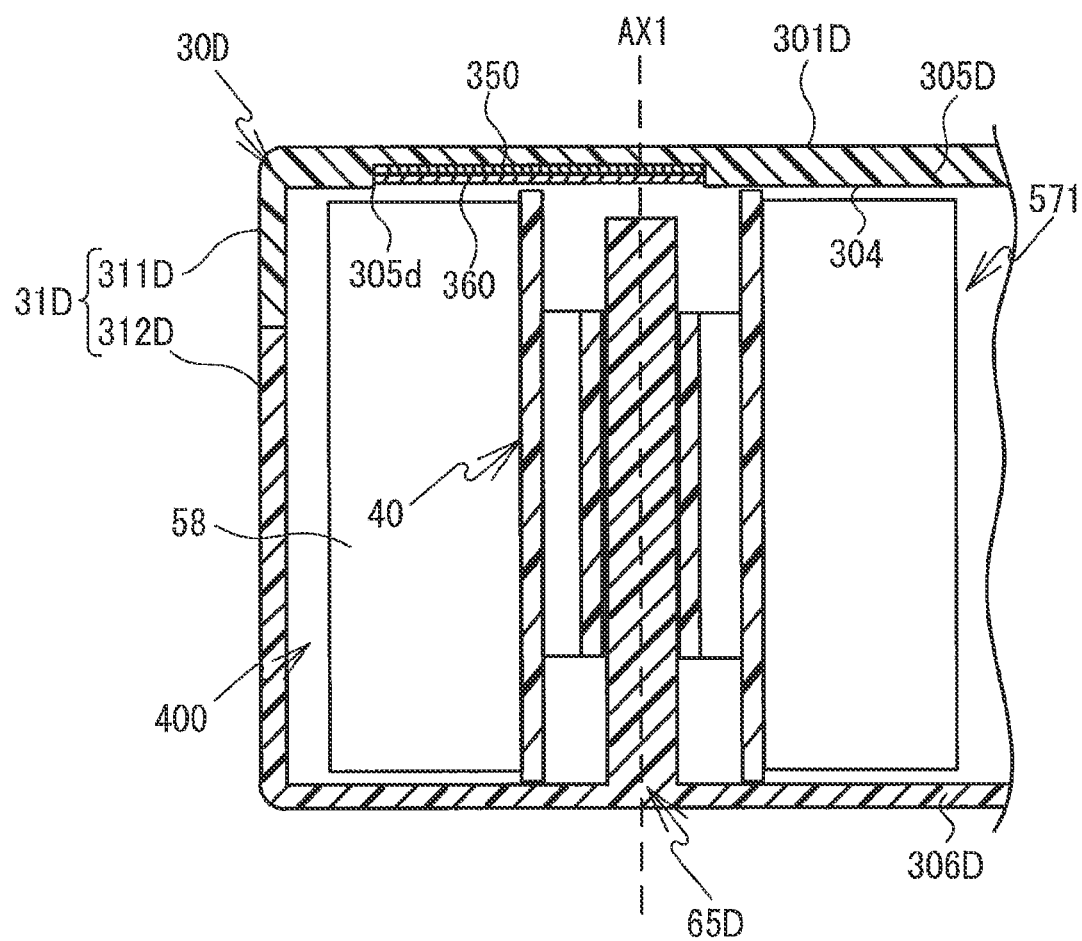
FIG. 11 is a cross-sectional view of a tape cassette according to a fourth modification taken along a line corresponding to the line VI-VI in FIG. 5.

FIG. 11 illustrates the tape cassette 30D according to the fourth modification. The tape cassette 30D includes a cassette case 31D configured of an upper case 311D and a lower case 312D. The first tape roll 571 is rotatably supported by a first tape support portion 65D provided at a lower wall 306D of the lower case 312D. In the fourth modification, the RFID tag 350 is provided at an upper wall 305D of the upper case 311D, as in third modification. In a plan view, the RFID tag 350 of the tape cassette 30D is at a position the same as the position of the RFID tag 350 of the tape cassette 30D of the third modification (FIG. 10). However, the RFID tag 350 of the tape cassette 30D is not positioned at an outer surface (upper surface 301D) of the upper wall 305D, but is positioned at an inner surface (lower surface 304) of the upper wall 305D.

More specifically, a tag retaining portion 305d is formed in the upper wall 305D at a position directly above the first tape roll 571D. The tag retaining portion 305d is a recessed portion that is recessed upward from the inner surface 304 of the upper wall 305D. The tag retaining portion 305d has a circular shape and is sized to conform with the size of the RFID tag 350.

The RFID tag 350 and the shield member 360 are positioned inside the tag regaining portion 305d. The RFID tag 350 is adhered to an upper surface of the tag retaining portion 305d. The shield member 360 is adhered to a lower surface of the RFID tag 350. That is, the shield member 360 is positioned between the first tape roll 571 and the RFID tag 350. The RFID tag 350 does not protrude out of the tag retaining portion 305d, but is retained within the tag retaining portion 305d.

Although not illustrated, in a tape printer to which the tape cassette 30C or the tape cassette 30D is attachable, an antenna (corresponding to the antenna 201) is provided at a lower surface of a cassette cover (corresponding to the cassette cover 6). The antenna is positioned in alignment with the RFID tag 350 of the tape cassette 30C or the tape cassette 30D with respect to the upward/downward direction. In accordance with closing of the cassette cover in the attached state of the tape cassette 30C or the tape cassette 30D to a cassette receiving portion, the antenna comes to a position adjacent to the RFID tag 350 from above, so that data reading and writing with respect to the RFID tag 350 can be performed.

Any one of the above-described second through fourth modifications may be also combined with the first modification.

<Fifth and Sixth Modifications>

Tape cassettes 30E and 30F according to fifth and sixth modifications will next be described with reference to FIGS. 12 through 14. The tape cassettes 30E and 30F have external appearance different from that of the above-described embodiment.

Figure 12:
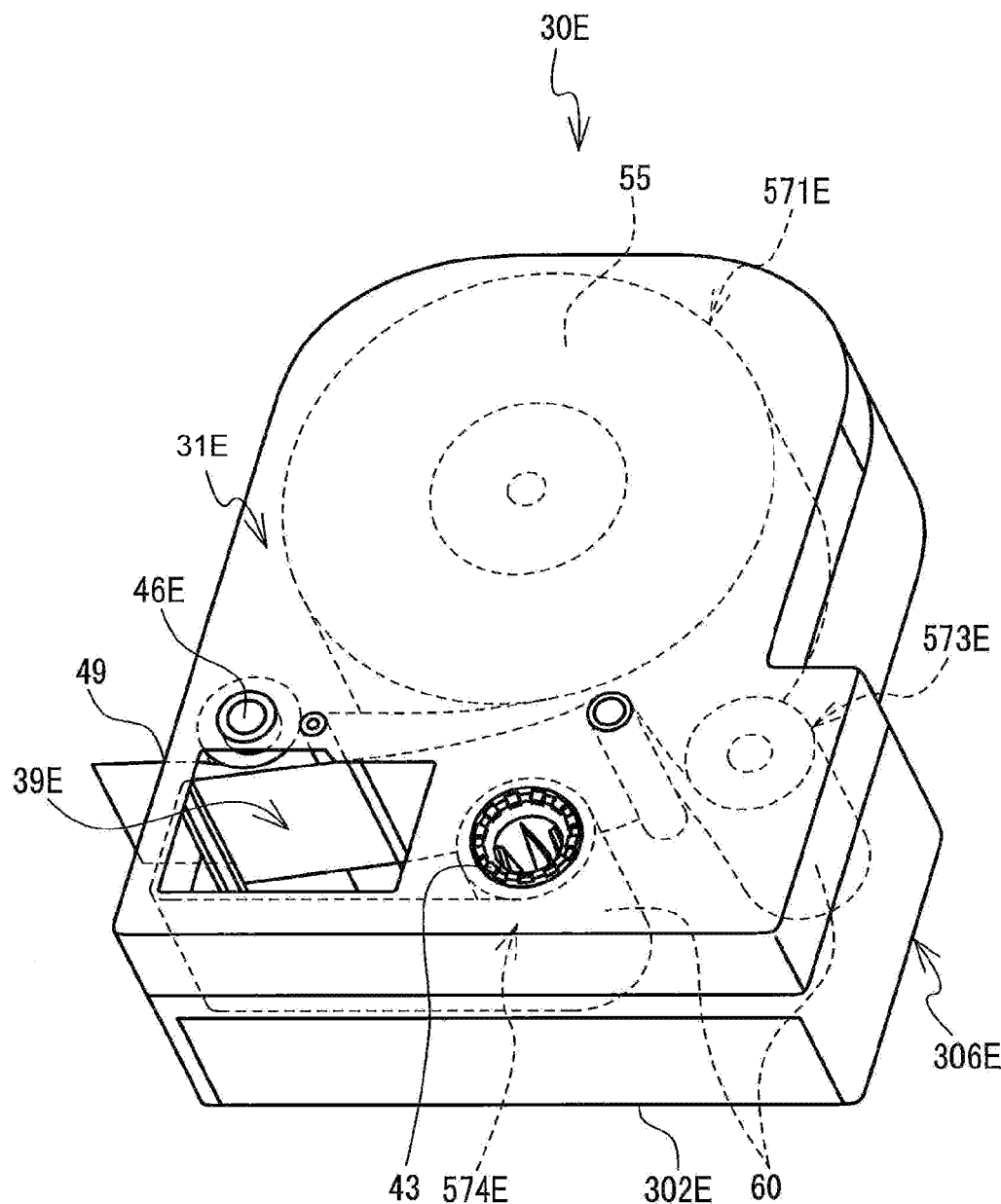
FIG. 12 is a perspective view of a tape cassette according to a fifth modification.
Figure 13:
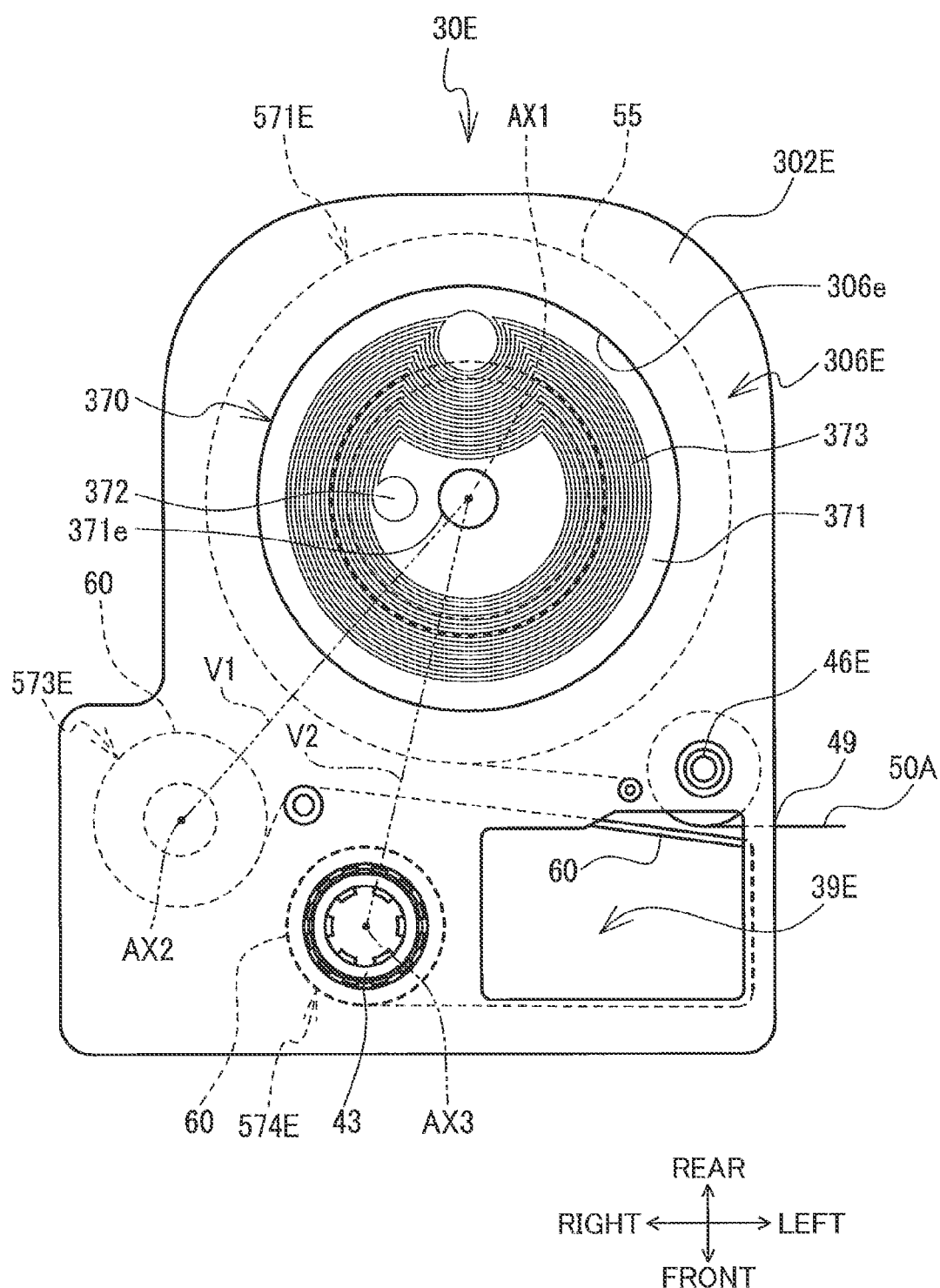
FIG. 13 is a bottom view of the tape cassette according to the fifth modification.

FIGS. 12 and 13 illustrate the tape cassette 30E according to the fifth modification. The tape cassette 30E includes a cassette case 31E having a generally box shape whose dimension in the frontward/rearward direction is greater than a dimension thereof in the leftward/rightward direction. The tape cassette 30E is a receptor-type cassette in which the print tape 55 and the ink ribbon ink ribbon 60 are accommodated inside the cassette case 31E.

Specifically, a first tape roll 571E (a roll of the print tape 55) is positioned at a rear portion of the cassette case 31E. A supply ribbon roll 573E is positioned at a right-front portion of the cassette case 31E. A head opening 39E is positioned at a left-front portion of the cassette case 31E. The head opening 39E extends to penetrate the cassette case 31E in the upward/downward direction. A tape drive roller 46E is supported by the cassette case 31E at a position rearward of and adjacent to the head opening 39E. A take-up ribbon roll 574E is accommodated in a region surrounded by the first tape roll 571E, the supply ribbon roll 573E, and the head opening 39E within the cassette case 31.

As illustrated in FIG. 13, an RFID tag 370 is provided at a lower wall 306E of the cassette case 31E. Similar to the RFID tag 350 (FIG. 5) of the tape cassette 30 according to the above-described embodiment, the RFID tag 370 includes a circular seal base 371, a storage element 372, and an antenna 373. However, in contrast to the RFID tag 350, the circular seal base 371 has a center portion formed with a through-hole 371e extending throughout a thickness thereof. The storage element 372 is arranged on the seal base 371 at a position adjacent to the through-hole 371e. The antenna 373 is positioned radially outward of the storage element 372 and is wound about a radial center of the through-hole 371e on the seal base 371.

A tag retaining portion 306e is formed in the lower wall 306E and at a position directly below the first tape roll 571E. Specifically, the tag retaining portion 306e is a recessed portion that is recessed upward from an outer surface (bottom surface 302E) of the lower wall 306E. The tag retaining portion 306e is circular in shape and has a size in conformity with the size of the RFID tag 370. As in the above-described embodiment, the RFID tag 370 and the shield member 360 superposed therewith are positioned inside the tag retaining portion 306e. The first tape roll 571E defines a winding axis AX1 passing through a center portion of the RFID tag 370, i.e., a radial center of the through-hole 371e. That is, at least a part of the through-hole 371e is overlapped with at least a part of the first tape roll 571E in the axial direction of the winding axis AX1 (i.e., in the upward/downward direction). Incidentally, the RFID tag 370 may be positioned at an inner surface of the lower wall 306E, as in the second modification illustrated in FIG. 9.

Figure 14:
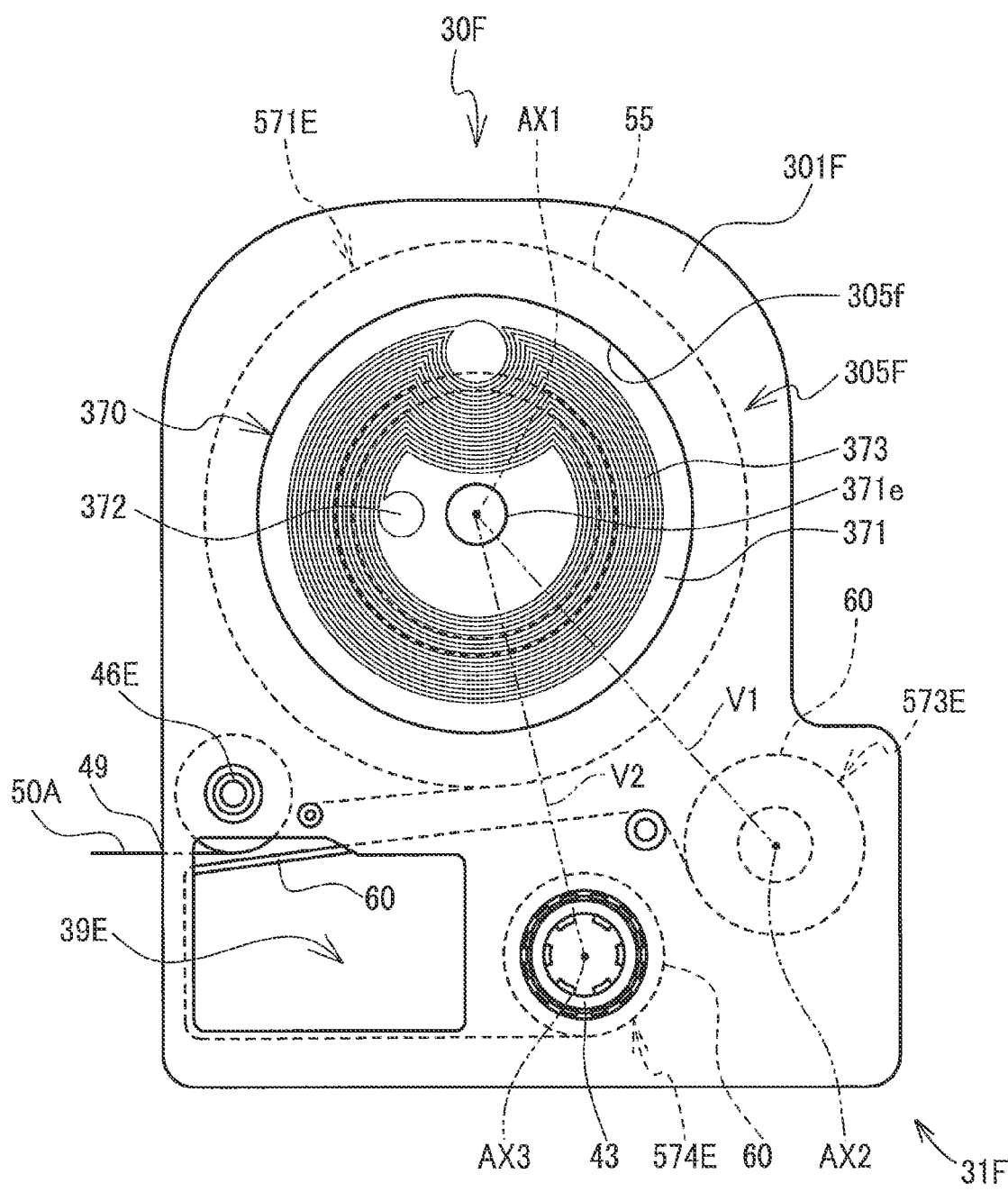
FIG. 14 is a plan view of a tape cassette according to a sixth modification.

FIG. 14 illustrates the tape cassette 30F according to the sixth modification. In contrast to the fifth modification, the RFID tag 370 of the tape cassette 30F is not positioned at the lower wall 306E, but is positioned at an outer surface (upper surface 301F) of an upper wall 305F of a cassette case 31F, similar to the third modification illustrated in FIG. 10. Specifically, in a plan view, the RFID tag 370 of the tape cassette 30F is at the same position as the RFID tag 370 of the tape cassette 30E of the fifth modification. However, a tag retaining portion 305f for receiving the RFID tag 370 is formed in the upper wall 305F to be recessed downward from the upper surface 301F. Incidentally, the RFID tag 370 may be positioned at an inner surface of the upper wall 305F similar to the fourth modification illustrated in FIG. 11.

As described above, each of the tape cassettes 30E and 30F according to the fifth and sixth modifications includes: the cassette case 31E (31F); the first tape roll 571E (571F); and the RFID tag 370. The RFID tag 370 is formed with the through-hole 371e. At least the part of the through-hole 371e is overlapped with at least the part of the first tape roll 571E, 571F in the predetermined direction (in the axial direction of the winding axis AX1 of the first tape roll 571E, 571F, or in the upward/downward direction). With this structure, the position of the RFID tag 370 can be more stabilized, so that desirable radiocommunication between the RFID tag 370 and an RFID reader/writer of a tape printer can be realized.

In the above-described embodiment and modifications, the double-sided adhesive tape 58 and the print tape 55 are examples of a "first tape" of the disclosure. However, the "first tape" need not be limited to the double-sided adhesive tape 58 and the print tape 55. For example, the "first tape" of the disclosure may be: a separator-less tape (a tape configured of multiple layers and having one surface formed with an adhesive layer; a stencil tape (a tape configured of multiple layers and having one surface superposed with a release sheet); a monolayer fabric tape; a monolayer magnetic tape; and a monolayer tubular tape.

While the description has been made in detail with reference to the specific embodiment, it would be apparent to those skilled in the art that various changes and modifications may be made therein without departing from the scope of the above described embodiment.

REMARKS

The tape cassettes 30, 30A, 30B, 30C, 30D, 30E and 30F are examples of a tape cassette. The cassette cases 31, 31A, 31B, 31C, 31D, 31E and 31F are examples of a cassette case. The double-sided adhesive tape 58 and the print tape 55 are examples of a first tape. The film tape 59 is an example of a second tape. The first tape rolls 571, 571A, 571E are examples of a first tape roll. The second tape roll 572 is an example of a second tape roll. The RFID tags 350, 370 are examples of an RDIF tag. Further, the supply ribbon rolls 573, 573A are examples of a ribbon roll and a supply ribbon roll. The take-up ribbon roll 574 is an example of a take-up ribbon roll. The shield member 360 is an example of a shield member. The head opening 39 is an example of a head opening. The winding axis AX1 is an example of a first winding axis. The winding axis AX2 is an example of a second winding axis. The first imaginary plane C1 is an example of a first imaginary plane. The second imaginary plane C2 is an example of a second imaginary plane, and an example of an imaginary plane. The imaginary plane V1 is an example of a third imaginary plane. The imaginary plane V2 is an example of a fourth imaginary plane. The divided region R1 is an example of a first divided region. The divided region R3 is an example of a second divided region. A sum of the divided regions R3 and R4 is an example of a first region. A sum of the divided regions R1 and R2 is an example of a second region.

What is claimed is:

1. A tape cassette for a printing device, the tape cassette comprising:
   a cassette case comprising an upper wall and a lower wall;
   a first tape roll accommodated in the cassette case and rotatably supported between the upper wall and the lower wall, the first tape roll comprising a first tape wound about a first winding axis extending in an axial direction, printing being configured to be performed on the first tape; and
   an RFID tag disposed at one of the upper wall and the lower wall, the RFID tag comprising an antenna and a storage element for radiocommunication to read and write data,
   wherein:
   the first tape paid out from the first tape roll is configured to be discharged out of the cassette case independently without being affixed to any other tape; and
   a part of the RFID tag is positioned to overlap with a part of the first tape roll in a predetermined direction parallel to the axial direction.

2. The tape cassette according to claim 1, further comprising:
   a ribbon roll accommodated in the cassette case and rotatably supported between the upper wall and the lower wall, the ribbon roll comprising an ink ribbon wound about a second winding axis extending in the axial direction, the ribbon roll being configured to rotate in a forward direction to convey the ink ribbon for printing; and
   a clutch made of metal and configured to apply load to the ribbon roll to prevent the ribbon roll from rotating in a reverse direction opposite the forward direction,
   wherein:
   the cassette case extends in a front-rear direction and a left-right direction orthogonal to each other and to the axial direction;
   the cassette case provides a total area which is divided into four divided regions by a first imaginary plane and a second imaginary plane, the first imaginary plane extending in the axial direction and the front-rear direction and passing through a center of the cassette case in the left-right direction, the second imaginary plane extending in the axial direction and the left-right direction and passing through a center of the cassette case in the front-rear direction, the four divided regions including a first divided region and a second divided region different from each other; and
   the RFID tag is positioned in the first divided region different from the second divided region in which the clutch is positioned.

3. The tape cassette according to claim 2, wherein the first divided region in which the RFID tag is positioned is diagonally opposite the second divided region in which the clutch is positioned.

4. The tape cassette according to claim 1, further comprising:
   a supply ribbon roll accommodated in the cassette case and rotatably supported between the upper wall and the lower wall, the supply ribbon roll comprising an ink ribbon wound about a second winding axis extending in the axial direction for printing; and
   a take-up ribbon roll accommodated in the cassette case and rotatably supported between the upper wall and the lower wall, the take-up ribbon roll defining a third winding axis about which the ink ribbon paid out from the supply ribbon roll is configured to be wound after printing, wherein:

a part of the RFID tag is positioned to cross at least one of a third imaginary plane and a fourth imaginary plane, the third imaginary plane extending in the axial direction to connect the first winding axis and the second winding axis, the fourth imaginary plane extending in the axial direction to connect the first winding axis and the third winding axis.

5. The tape cassette according to claim 1, further comprising a shield member positioned between the first tape roll and the RFID tag in the predetermined direction, the shield member being a nonmagnetic member.

6. The tape cassette according to claim 1, wherein the lower wall has an outer surface facing outward, the outer surface being formed with a recess, and wherein the RFID tag is provided in the recess.

7. The tape cassette according to claim 1, wherein the lower wall has an inner surface inside the cassette case, and wherein the RFID tag is provided at the inner surface of the lower wall to face the first tape roll in the predetermined direction.

8. The tape cassette according to claim 1, wherein the upper wall has an outer surface facing outward, the outer surface being formed with a recess, and wherein the RFID tag is provided in the recess.

9. The tape cassette according to claim 1, wherein the upper wall has an inner surface facing inside the cassette case, and wherein the RFID tag is provided at the inner surface of the upper wall to face the first tape roll in the predetermined direction.

10. The tape cassette according to claim 1, wherein the cassette case is formed with a head opening for receiving a print head of the printing device, wherein:

the cassette case extends in a front-rear direction and a left-right direction orthogonal to each other and to the axial direction;

the cassette case provides a total area which is divided into a first region and a second region by an imaginary plane extending in the axial direction and the left-right direction and passing through a center of the cassette case in the front-rear direction; and the head opening is positioned in the first region and the RFID tag is positioned in the second region.

11. The tape cassette according to claim 1, wherein the cassette case comprises a tape discharge portion through which the first tape is configured to be discharged after printing, wherein:

the cassette case extends in a front-rear direction and a left-right direction orthogonal to each other and to the axial direction;

the cassette case provides a total area which is divided into a first region and a second region by an imaginary plane extending in the axial direction and the left-right direction and passing through a center of the cassette case in the front-rear direction; and the tape discharge portion is positioned in the first region and the RFID tag is positioned in the second region.

* * * * *